United States Patent [19]
Soumiya et al.

[11] Patent Number: 5,583,857
[45] Date of Patent: Dec. 10, 1996

[54] CONNECTION ADMISSION CONTROL METHOD AND SYSTEM IN A NETWORK FOR A BANDWIDTH ALLOCATION BASED ON THE AVERAGE CELL RATE

[75] Inventors: Toshio Soumiya; Naotoshi Watanabe; Masafumi Katoh, all of Kawasaki, Japan

[73] Assignee: Fujitsu Limited, Kanagawa, Japan

[21] Appl. No.: 406,012

[22] Filed: Mar. 16, 1995

[30] Foreign Application Priority Data

Mar. 17, 1994 [JP] Japan .................................. 6-047092

[51] Int. Cl.⁶ .................................................. H04L 12/56
[52] U.S. Cl. ........................... 370/233; 370/234; 370/253
[58] Field of Search ................................ 370/94.1, 94.2, 370/60, 17, 60.1, 13

[56] References Cited

U.S. PATENT DOCUMENTS

| | | | |
|---|---|---|---|
| 5,280,483 | 1/1994 | Kamoi et al. | 370/94.1 |
| 5,335,222 | 8/1994 | Kamoi et al. | 370/60 |
| 5,341,366 | 8/1994 | Soumiya et al. | 370/17 |
| 5,357,507 | 10/1994 | Hughes et al. | 370/60 |
| 5,390,184 | 2/1995 | Morris | 370/94.2 |

*Primary Examiner*—Wellington Chin
*Assistant Examiner*—Melissa Kay Carman

[57] ABSTRACT

A connection admission control method for allocating many calls to a transmission line while guaranteeing the quality of service such as the cell loss ratio, where an average cell rate/peak cell rate comparator judges that a call requesting admission has a variable-speed traffic property when the average cell rate Ra and the peak cell rate Rp which are declared by the user are different. A traffic class judging portion determines the traffic class to which the call belongs on the basis of the peak cell rate. A required bandwidth calculator obtains the required bandwidth for guaranteeing the quality on the basis of the sum of the average cell rate of the call requesting admission and the average cell rates of all the calls that belong to the traffic class and that are already allocated to a transmission line, and outputs the calculated bandwidth as the estimated bandwidth. An estimated bandwidth calculator for calls having a variable-speed traffic property calculates the estimated total bandwidth for all the traffic classes, and a call admission judging portion judges whether or not there is a vacant bandwidth in the transmission line which is necessary for accepting the call requesting admission with consideration of the calculated estimated total bandwidth and the physical bandwidth, and accept the call if vacant bandwidth exists, otherwise reject the call.

19 Claims, 29 Drawing Sheets

Ton : BURST-ON PERIOD
(WHICH FOLLOWS THE EXPONENTIAL DISTRIBUTION OF AVERAGE Ton)(sec)

Toff : BURST-OFF PERIOD
(WHICH FOLLOWS THE EXPONENTIAL DISTRIBUTION OF AVERAGE Toff)(sec)

T : MINIMUM CELL INTERVAL PERIOD (FIXED)(sec)

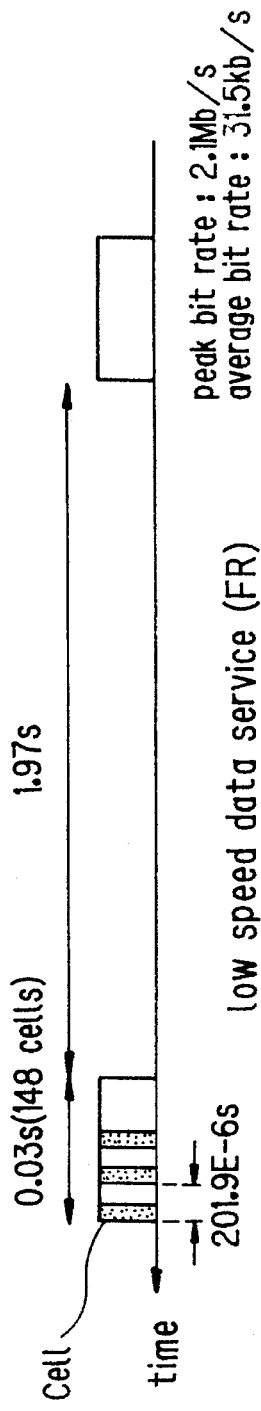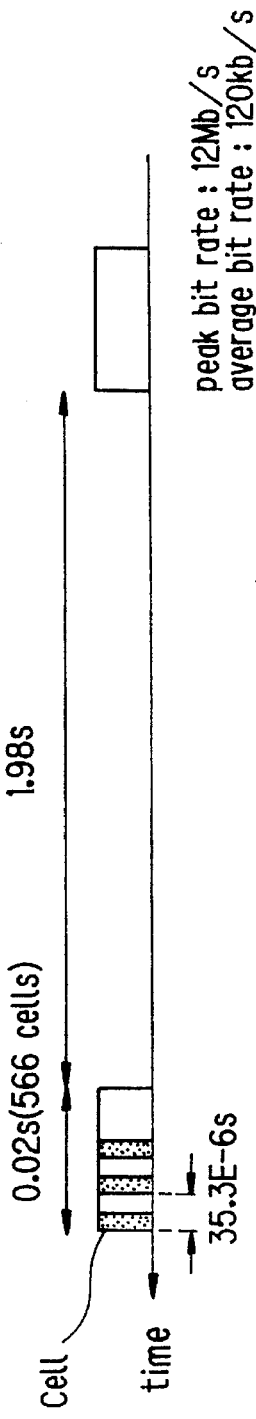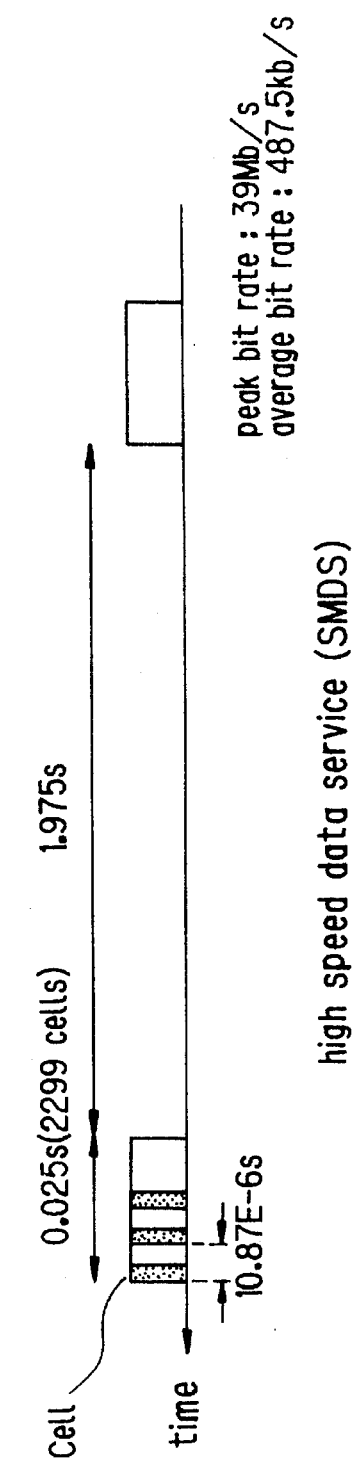

FIG. 11

| | TRAFFIC CLASS | Cells/s(AVERAGE CELL RATE) | APPLICABLE SERVICE |
|---|---|---|---|
| 1 | 2.1Mb/s | 4953(31.5Kb/s) | Frame Relay,SMDS,CE |
| 2 | 7.02Mb/s | 16560 | Video(MPEG II) |
| 3 | 12.29Mb/s | 28980(123Kb/s) | EtherNet |
| 4 | 24.96Mb/s | | |
| 5 | 40.704Mb/s | 96000(508.8Kb/s) | SMDS |
| 6 | 50.84Mb/s | 119910 | CE |
| 7 | 74.88 Mb/s | 176603.7736 | |
| 8 | 149.76Mb/s | 353207.5472 | |
| 9 | 299.52Mb/s | 706415.0943 | |
| 10 | 599.04Mb/s | 1412830.189 | |

FIG. 12

MMPP/D/1(K=67)

| Service[QOS] | Required bandwidth | 150 Mb/s | 100 Mb/s | 50 Mb/s |
|---|---|---|---|---|
| Frame Relay | $10^{-7}$ | 0.560 ($\Sigma Ra$=84Mb/s) | 0.481 ($\Sigma Ra$=48.1Mb/s) | 0.330 ($\Sigma Ra$=16.5Mb/s) |
| Peak:2.1Mb/s | $10^{-10}$ | 0.467 ($\Sigma Ra$=70Mb/s) | 0.425 ($\Sigma Ra$=42.5Mb/s) | 0.220 ($\Sigma Ra$=11Mb/s) |
| Middle cell rate data | $10^{-7}$ | 0.173 | 0.098 | 0.096 |
| Peak:12Mb/s | $10^{-10}$ | 0.093 | 0.043 | 0.021 |
| SMDS | $10^{-7}$ | 0.027 | XX | XX |
| Peak:39Mb/s | $10^{-10}$ | XX | XX | XX |

XX: under 0.01

CONNECTION ADMISSION CONTROL METHOD AND SYSTEM IN A NETWORK FOR A BANDWIDTH ALLOCATION BASED ON THE AVERAGE CELL RATE

BACKGROUND OF THE INVENTION

The present invention relates to a connection admission control method in an ATM network system and, more particularly, to a connection admission control method for determining whether or not a connection is to be accepted on the basis of the average cell rate, the peak cell rate and the bandwidth of a transmission link which are declared by the user at the time of calling.

There is increasing demand not only for audio communication and data communication but also for multimedia communication in which moving pictures are transmitted as well as audio and data. As a means for realizing such broadband communication, an agreement has been reached by the ITU-T upon an exchanging technique in a B-ISDN (Broadband-ISDN) system, which is based on an asynchronous transfer mode (ATM), and the technique is being put to practical use.

In the ATM, all the information is converted into fixed information which is called a cell without depending upon continuous information such as an audio and a moving picture or burst information such as data, and transferred at high speed without depending upon the respective communication speed. More specifically, in the ATM, a line is allocated to a plurality of calls by establishing a multiplicity of logical links on a physical line. The moving picture data and the audio data transmitted from a terminal corresponding to each call are separated into information units (which are called "cells") having a fixed length, and the cells are serially transmitted over a line, thereby realizing multiplex communication.

Each cell is composed of a block having a fixed length of 53 bytes, as shown in FIG. 26. In the 53 bytes, 5 bytes constitute a header portion HD and 48 bytes an information field (information portion) DT. The header portion HD includes a virtual channel identifier (VCI) for identifying a connection so as to indicate the destination even after the data is separated into blocks. The header portion HD also includes a virtual path identifier (VPI) for specifying a path, a generic flow control (GFC) which is used for flow control between links, a payload type (PT), a header error control (HEC) for correcting errors, etc.

FIG. 27 schematically shows the structure of an ATM network so as to explain ATM transmission. In FIG. 27, the reference numerals 1a, 1b represent ATM terminals, and 3 an ATM network. The ATM network 3 is provided with an information network 3a for transferring a data cell, and a signal network 3b for transferring a control signal. The call processing units or processors (CPUs) 3d-1 to 3d-n of the ATM network systems 3c-1 to 3c-n in the information network 3a are connected to the signal network 3b.

When the originating terminal 1a executes a calling operation so as to call the terminating terminal 1b, the cell assembling portion of the originating terminal partitions the SET UP message (data which includes the originating number, the terminating number, the type of terminal, the average cell rate, the peak cell rate, etc.) into cell units, attaches a signal VCI (which is determined in advance for the respective terminal) to each partitioned data to form a signal cell and sends the signal cell to the ATM network 3.

When the signaling device of the ATM network system 3c-1 (on the originating side) receives the signal cell, it assembles the information contained in the signal cell and supplies the assembled information to the CPU 3d-1. On the basis of the received message, the CPU executes such calling processing as processing for analyzing calling-party service, billing processing, processing for interpreting digits on the side of the terminating party, etc., and determines a virtual path identifier (VPI) and a virtual channel identifier (VCI) on the basis of the declared average cell rate and peak cell rate, and in accordance with a protocol No. 7, supplies connection information which includes data such as the originating umber, terminating number, VPI and VCI, to the subsequent relay exchange 3c-2 via the signal network 3b. The relay exchange 3c-2 executes similar processing to that of the exchange 3c-1 on the originating side. After repetition of similar processing, the paths and the relay ATM network systems 3c-2, 3c-3, . . . between the exchange 3c-1 on the originating side and the ATM network system 3c-n to which the terminating terminal 1b is connected are finally determined. When the ATM network system 3c-n on the terminating side receives the connection information including the originating number, the terminating number and the VCI of the higher-order ATM network system 3c-3, the ATM network system 3c-n allocates a predetermined VCI to the terminating terminal 1b and judges whether or not the terminating terminal 1b is communicable. If the answer is YES, the signal network 3b informs the exchange 3c-1 on the originating side that the terminating terminal 1b is communicable, and the exchange 3c-1 on the originating side allocates a predetermined VCI to the originating terminal 1a.

Each of the ATM network systems 3c-1 to 3c-n on paths registers the following, for each path, in an internal routing table in a form correlated with the VCI of the higher-order ATM network system: (1) information (referred to as routing information or tag information) for specifying the outgoing highway of the cell having the specific VCI, and (2) new VCI and VPI which are to be added to the outputted cell.

In this manner, when the paths are formed between the originating terminal 1a and the terminating terminal 1b, these terminals 1a, 1b transmit and receive the signaling cells and the response cells and confirm the communication procedure in mutual fashion. Thereafter, the originating terminal 1a separates the data to be transmitted into predetermined byte lengths, generates a cell with a header including the allocated VCI attached thereto, and sends the cell to the ATM network 3. When the cell is input from the higher-order exchange through a predetermined incoming highway, each of the ATM network systems 3c-1 to 3c-n replaces the VPI/VCI of the input cell by reference to its own routing table and sends the cell out on a predetermined outgoing highway on the basis of the tag information. As a result, the cell output from the originating terminal 1a reaches to the exchange 3c-n on the terminating side via the paths determined by the call control. The exchange 3c-n on the terminating side replaces the VCI which is attached to the input cell with the VCI allocated to the terminating terminal 1b by reference to its routing table and sends the cell to the line to which the terminating terminal 1b is connected.

Thereafter, the originating terminal 1a serially transmits the cells to the terminating terminal 1b, and the terminating terminal 1b assembles the information portion DT contained in the received cells and restores the original data.

In the above explanation, only one call is processed, but by providing different VCI values for both ends of the respective lines between a terminal and an ATM network system and between mutually adjacent ATM network systems, it is possible to establish logical links on one line in correspondence with a multiplicity of calls, thereby realizing high-speed multiplex communication. According to the ATM, it is possible to multiplex information from information sources having different transmission rates such as moving pictures, data and audio, so that a single transmission line can be effectively used. In addition, data transmission at a very high speed on the order of 150 Mbps to 600 Mbps is enabled without the need for retransmission control or a complicated communication procedure which is conventionally implemented by software through packet switching.

An ATM network system has a buffering function, which enables the ATM network system to accept a call without keeping the originating terminal waiting and to send it to the terminating terminal even if there are a multiplicity of calls to the ATM network system or the terminating terminal. For example, when there are a multiplicity of simultaneous calls to the terminating terminal $1b$ and therefore there is no vacant line between the exchange $3c$-n on the terminating side and the terminating terminal $1b$, there remains a cell which cannot be sent to the terminating terminal $1b$. In this case, the exchange $3c$-n on the terminating side buffers the remaining cell and sends it when a line becomes vacant. In this manner, it is possible to accept a call to the terminating terminal without keeping the originating terminal waiting.

FIG. 28 shows the structure of a self-routing ATM network system. The self-routing ATM network system is provided with a basic switching unit SWU, a control information add-on unit CIAU, and a CPU (call processing unit) for processing a calling. Although one self-routing switch module SRM 1 exists between the input lines and the output lines in this ATM network system, a plurality of self-routing switch modules may be connected between them.

The input ends of the module SRM 1 are connected to the input lines (incoming highways) #1 to #3 via the control information add-on unit CIAU, and the output ends are connected to the output lines (outgoing highways) #1 to #3. The control information add-on unit CIAU is provided with add-on circuits AC1 to AC3 for adding routing information or the like in correspondence with the respective input lines #1 to #3. Each of the add-on circuits AC1 to AC3 adds a tag (routing header) to the cell which is input from the corresponding input line, replaces the VCI contained in the cell information and supplies the cell to the basic switching unit SWU.

The call processing unit CPU controls a call so as to determine the VCI and the VPI of a cell at the time of calling, determines the routing header RH in accordance with the location of the terminating terminal and writes the control information (VPI/VCI, RH) in a routing table (not shown) of the add-on circuit to which the cell is input. The add-on circuit to which the cell is input is already clear from the information supplied by a higher-order ATM network system. That is, the determined control information is written in the routing table of the add-on circuit in correspondence with the VCI of the higher-order ATM network system.

When the cell is input to a predetermined input line via the higher-order ATM network system after the end of the call control, one of the add-on circuit AC1 to AC3 which is connected to the input line reads, from the routing table, the control information (routing header RH and VCI) which corresponds to the VCI attached to the input cell. The add-on circuit attaches the routing header RH to the cell, replaces the VCI of the cell with the read VCI, and supplies the cell to the basic switching unit SWU.

The self-routing switch module SRM 1 of the basic switching unit SWU transmits the cells from a predetermined output line in accordance with the routing header RH. The routing header is removed by a post-processing circuit (not shown) before the cell is transmitted to the output line.

FIG. 29 is a circuit diagram of an example of the self-routing switch module (SRM 1). The symbols $I_1$ to $I_3$ represent control information detectors, $D_1$ to $D_3$ transmission information delay circuits, $DM_1$ to $DM_3$ demultiplexers, and $DEC_1$ to $DEC_3$ control information decoders. All these elements constitute a cell distributor CELD. The symbols $FM_{11}$ to $FM_{33}$ represent buffer memories such as FIFO (First-In First-Out) memories, $SEL_1$ to $SEL_3$ selectors, and $AOM_1$ to $AOM_3$ arrival-order management FIFOs. The arrival-order management FIFOs ($AOM_1$ to $AOM_3$), which are connected to the output ends of the control information decoders $DEC_1$ to $DEC_3$, respectively, store the order of arrival of the cells into the corresponding three buffer memories $FM_{11}$ to $FM_{13}$, $FM_{21}$ to $FM_{23}$ and $FM_{31}$ to $FM_{33}$, respectively, control the selectors $SEL_1$ to $SEL_3$, respectively, so as to read the cells from the buffer memories in the order of arrival, and supply the cells to the output lines #1 to #3, respectively.

The detector $I_i$ ($i=1$ to 3) extracts the control information contained in the cell and supplies the information to the decoder $DEC_i$ ($i=1$ to 3).

If the input routing header RH represents the output terminal #j ($j=1$ to 3), the decoder $DEC_i$ operates the demultiplexer $DM_i$ by a switch signal $S_i$ and transmits the transmission information to the FIFO memory $FM_{ji}$. For example, if the routing header RH contained in the information input from the input terminal #1 represents the output terminal #2, the decoder $DEC_1$ operates the demultiplexer $DM_1$ and inputs the information supplied from the input terminal #1 to the FIFO memory $FM_{21}$. The arrival-order management FIFO ($AOM_i$) is connected to the output terminal of the corresponding control information decoder $DEC_1$ to $DEC_3$ and stores the order of arrival of the cells to the corresponding three buffer memories $FM_{i1}$ to $FM_{i3}$. For example, if the cells arrive to the buffer memories in the order of $FM_{11}$, $FM_{12}$, $FM_{13}$, $FM_{12}$, . . . , buffer memory identification codes 1, 2, 3, 2, . . . are stored in the arrival-order management FIFO ($AOM_i$) in the order of arrival of the cells. Thereafter, the arrival-order management FIFO ($AOM_i$) controls the corresponding selector $SEL_i$, to read the cells from the three buffer memories $FM_{i1}$ to $FM_{i3}$ in the order of arrival of the cells and supplies the cells to the output line #i.

In this manner, since the FIFO memory $FM_{ij}$ has a capacity for a plurality of cells, it has a buffering function which is capable of adequately dealing with the problem such as a temporary increase of transmission data. In addition, since cells are read from the buffer memories $FM_{i1}$ to $FM_{i3}$ in the order of arrival of the cells, an equal number of cells remain in each of the buffer memories $FM_{i1}$ to $FM_{i3}$, and it never happens that cells overflow a buffer memory and are therefore discarded.

The ATM transmission, however, has the following problem. Since various traffics having different information rates and different burst properties (burst means an abrupt increase in the quantity of information) are synthetically handled, when there is a traffic having an especially strong burst property, it is impossible without an appropriate call reception control to provide a service quality (cell loss ratio, delay time) which is required by the user. For this reason, in the case of a bandwidth-guaranteed connection call, an ATM network system judges whether or not a necessary bandwidth is vacant in a predetermined transmission line on the basis of the physical bandwidth of the transmission line, the average cell rate and the peak cell rate which are declared from the user (ATM terminal), and if the answer is in the affirmative, the ATM network system accepts the call, while rejecting the call if the answer is in the negative. If there is a call having a variable-speed traffic property in which the average cell rate is different from the peak cell rate, adoption of a controlling method which determines whether or not the call is accepted on the assumption that the peak cell rate of the call is a necessary bandwidth is simple, but it reduces the number of calls which can be allocated to a transmission line, thereby lowering the utilization of a transmission line. On the other hand, a controlling method which determines whether or not the call is accepted on the assumption that the necessary bandwidth is the average cell rate can allocate many calls to a transmission line, thereby enhancing the utilization of a transmission line. However, if cells are allocated on the basis of the average cell rate, for example, when the peak of the transmission rate for each call overlaps one another, cells beyond the bandwidth of the transmission line are lost. As a result, it is impossible to meet the required cell loss ratio, which causes sound skipping, picture missing and data loss on the terminating side. In order to solve these problems, cells are allocated on the basis of both the average cell rate and the peak cell rate in the call reception control adopted at present, thereby enhancing the utilization of a transmission line while maintaining a predetermined cell loss ratio.

FIG. 30 is an explanatory view of the connection admission control in an ATM network system, and FIG. 31 is a flow chart of the connection admission control algorithm of a conventional ATM network system. In FIG. 30, (1) the reference numeral $Vt$ represents the physical bandwidth of a transmission line, (2) $Vpht$ the sum of the peak (maximum) cell rates of all the calls allocated on the basis of the peak cell rate, (3) $Vavt$ the sum of the average cell rates of all the calls allocated on the basis of the average cell rate, and (4) $Vpts$ the sum of the peak cell rates of all the cells that are in the process of communication. Further, (5) the reference numeral $Vp$ represents the peak cell rate of a new call (which is requesting admission), and (6) $Vav$ the average cell rate of the call which is requesting admission.

When the number of calls allocated to the transmission line increases, the peaks and the bottoms of the transmission rates overlap each other and they are levelled due to a statistical multiplex effect, so that it is possible to accommodate a larger number of calls than an apparent number of calls. In the connection admission control (CAC) shown in FIG. 31, calls are allocated on the basis of both the average cell rate and the peak cell rate by utilizing such a statistical multiplex effect.

When a user requests a call to be accepted (at the time of calling), the user declares the parameters (peak cell rate (Vp), average cell rate (Vav), burst duration, number (Nc) of cells during the burst duration, burst occurrence interval, burst ratio (Rb), etc.) indicating the attribute of the call to the ATM network system. The ATM network system calculates the average cell traffic a, the distribution v of the cell traffic, and the coefficient v/a of call fluctuation from the declared parameters (step 101). If the coefficient v/a of call fluctuation is not more than 1, the ATM network system allocates the call on the basis of the average cell rate, while if the coefficient v/a is more than 1, the ATM network system allocates the call on the basis of the peak cell rate.

It is also possible to determine whether the call requesting admission is allocated on the basis of the average cell rate or the peak cell rate depending on whether $(Vt-Vpht)/Vp$ is not less than a preset value X, wherein X represents the minimum (transmission rate/maximum information cell rate) when burst multiplex traffic can be approximated in accordance with a Poisson distribution, and X is, for example, 100. More specifically, how many (Y) peak cell rates $Vp$ of the call which is requesting admission are accommodated in the bandwidth $(Vt-Vpht)$ obtained by subtracting the sum $Vpht$ of the peak cell rates of all the calls that are allocated on the basis of the peak cell rate from the capacity $Vt$ of the transmission line is calculated. If $Y \geq X$, the peaks and the bottoms of the transmission rates overlap each other and they are levelled due to a statistical multiplex effect, so that it is possible to accommodate a larger number calls than an apparent number of calls. In this case, the call is allocated on the basis of the average cell rate. On the other hand, if $Y > X$, the call is allocated on the basis of the peak cell rate (step 102).

When the call is allocated on the basis of the average cell rate, it is then judged whether or not the call can be allocated in the vacant bandwidth of the current transmission line. That is, judgement is made as to whether or not $Vav+Vavt$ is smaller than $(Vt-Vpht)\cdot\rho max$ (step 103), wherein $\rho max$ represents the maximum utilization factor determined by a prescribed cell loss ratio CLR and the amount m of buffer when a M/D/1 model is used. The M/D/1 model is a switch module in which cells reach the buffer at random from a plurality of input lines and are read out of the buffer at regular intervals from one output line.

If $(Vav+Vavt) \leq (Vt-Vpht)\cdot\rho max$, since the call can be allocated in a vacant bandwidth of the current transmission line, Vpts and Vavt are renewed by $Vpts+Vp \rightarrow Vpts$, $Vavt+Vav \rightarrow Vavt$ (step 104), the call is accepted and the next call is waited for. On the other hand, if $(Vav+Vavt) > (Vt-Vpht)\cdot\rho max$, since it is impossible to accept the call in a vacant bandwidth of the current transmission line, the admission of the call is rejected (step 105) and the next call is waited for.

When the call is allocated on the basis of the maximum rate at the step 102, it is judged whether or not the call can be allocated in a vacant bandwidth of the current transmission line. That is, judgement is made as to whether or not $(Vpts+Vp) \leq Vt$ (step 106), if the answer is YES, since the cell can be allocated in a vacant bandwidth of the current transmission line, Vpts and Vpht are renewed by $Vpts+Vp \rightarrow Vpts$, $Vpht+Vp \rightarrow Vpht$ (step 107), the call is accepted and the next call is waited for. On the other hand, if $(Vpts+Vp) > Vt$, since it is impossible to accept the call in a vacant bandwidth of the current transmission line, the admission of the call is rejected (step 105) and the next call is waited for.

In the conventional call admission algorithm, however, since the value of X or v is generally large in the case of burst traffic, approximately all the calls having a burst traffic property are allocated on the basis of the peak cell rate, which brings about a problem of a reduction in the utilization of a transmission line. For example, If it is assumed that X=100 and Vt=150 Mb/s, it is only the calls having a peak cell rate of not more than 1.5 Mb/s that the calls can be allocated on the basis of the average cell rate, and all the calls having a variable-speed traffic property such as the calls having a peak cell rate of 10 Mb/s, 20 Mb/s, or the like are allocated on the basis of the peak cell rate, which reduces the utilization of the transmission line.

SUMMARY OF THE INVENTION

Accordingly, it is an object of the present invention to eliminate the above-described problems in the related art and to provide a connection admission control method in an ATM network system which is capable or bandwidth allocation approximately based on the average cell rate in accordance with the calculated bandwidth (estimated bandwidth) which can guarantee a quality of service (QOS) such as a cell loss ratio even if in the case of accepting a call having a burst traffic property.

It is another object of the present invention to provide a connection admission control method in an ATM network system which is capable of allocating many calls to a transmission line and hence, enhancing the permissible utilization factor of a transmission line while guaranteeing a QOS such as a cell loss ratio.

To achieve these objects, in one aspect of the present invention there is provided a connection admission control method in an ATM network system comprising: a first step of judging a call (call requesting admission) has a variable-speed traffic property when the average cell rate and the peak cell rate declared by the user at the time of calling are different, and identifying traffic class of the call on the basis of the peak cell rate; a second step of obtaining the required bandwidth for guaranteeing the quality as an estimated bandwidth on the basis of the sum of the average cell rate of the call requesting admission and the average cell rates of all the calls that belong to the traffic class and that are already allocated to a transmission line; a third step of judging whether or not there is a vacant bandwidth in the transmission line which is necessary for accepting the call requesting admission, with the sum of the estimated bandwidths for all the traffic classes and the physical bandwidth of the transmission line taken into consideration; and a fourth step of accepting the call if the answer is in the affirmative, while rejecting the call if the answer is in the negative.

In another aspect of the present invention there is provided a connection admission control method in an ATM network system comprising the steps of: judging a call (requesting admission) has a variable-speed traffic property when the average cell rate and the peak cell rate declared by the user at the time of calling are different, and identifying traffic class of the call on the basis of the peak cell rate; obtaining the required bandwidth for guaranteeing the quality on the basis of the sum of the average cell rate of the call requesting admission and the average cell rates of all the calls belonging to the traffic class, and then calculating the sum of the required bandwidths for all traffic classes; judging said call has a fixed-speed traffic property when the average cell rate and the peak cell rate declared by the user are coincident, calculating the bandwidth necessary for all the calls having a fixed-speed traffic property; comparing the sum of the calculated sum of the required bandwidths for all traffic classes and the bandwidth necessary for all calls having a fixed-speed traffic property, with the physical bandwidth of the transmission line; and accepting the call when the sum is smaller than the physical bandwidth, while rejecting the call when the sum is larger than the physical bandwidth.

Other features and advantages of the present invention will be apparent from the following description taken in conjunction with the accompanying drawings.

BRIEF DESCRIPTION OF THE DRAWINGS

FIGS. 10A, 10B and 10C explain reference on-off models;

FIG. 11 is an explanatory view of traffic classes;

FIG. 12 is a table showing the permissible utilization factor;

DESCRIPTION OF THE PREFERRED EMBODIMENTS (A) Summary of the Invention

Figure 1:
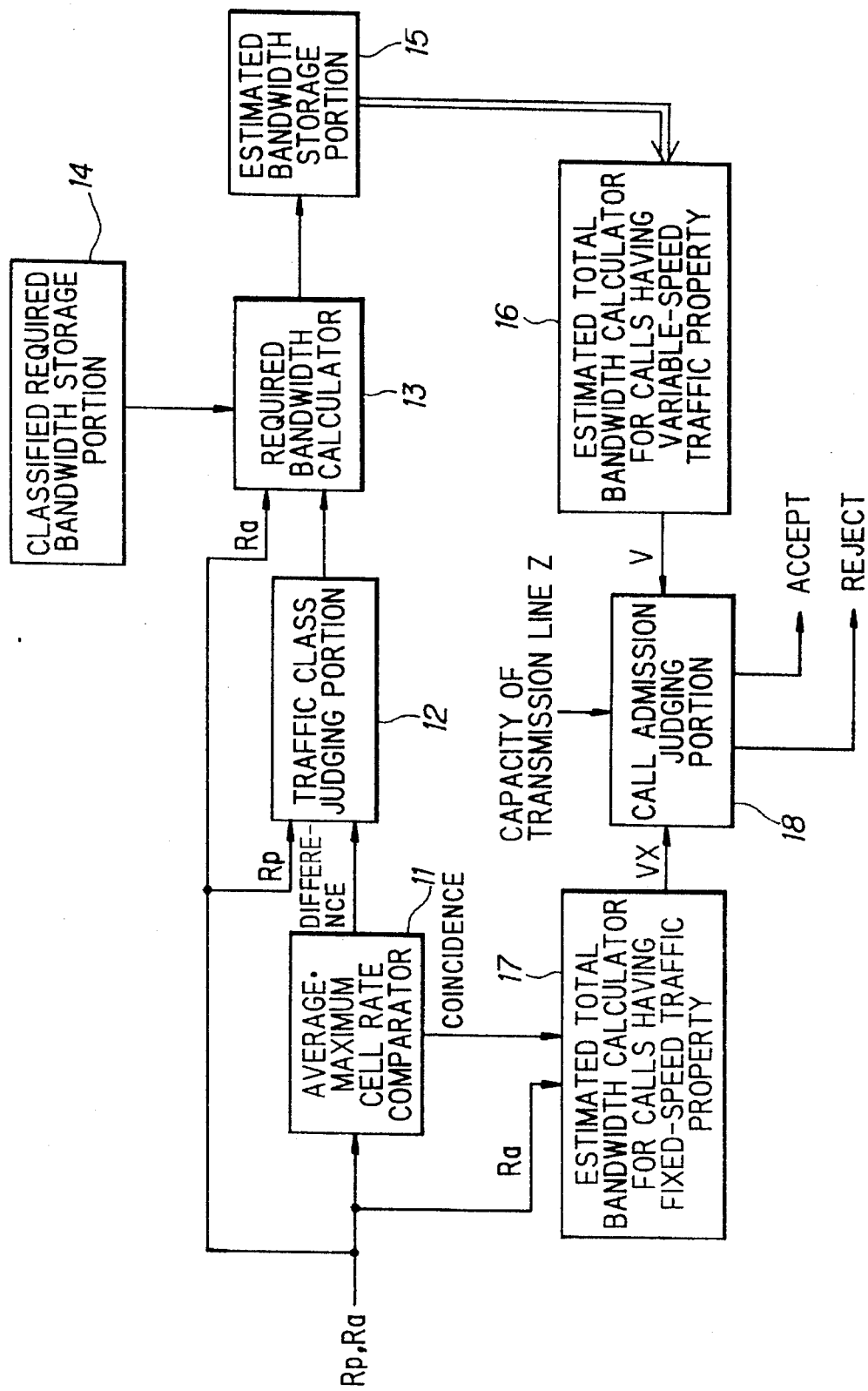
FIG. 1 is a schematic explanatory view of the present invention.

FIG. 1 is a schematic explanatory view of the present invention.

The reference numeral 11 represents an average.peak cell rate comparator for comparing the average cell rate Ra with the peak cell rate (maximum cell rate) Rp which are declared by the user (ATM terminal) at the time of calling so as to judge whether or not they are coincident, 12 a traffic class judging portion for judging a call requesting admission has a variable-speed traffic property when Ra≠Rp and judging traffic class to which the call belongs on the basis of the peak cell rate, 13 a required bandwidth calculator for calculating the required bandwidth for guaranteeing the quality (hereinafter referred to simply as "required bandwidth") on the basis of the sum of the average cell rate of the call requesting admission and the average cell rates of all the calls that belong to the traffic class to which the call requesting admission belongs and that are already allocated to a transmission line, 14 a classified required bandwidth storage portion for storing the required bandwidth which satisfies the required cell loss ratio for each traffic class in advance in a table in correspondence with the sum of the average cell rates, 15 an estimated bandwidth storage portion for storing the required bandwidth as estimated bandwidth in each class at the current time of point, 16 an estimated bandwidth calculator for calls having a variable-speed traffic property which calculates the estimated total bandwidth V for all traffic classes at the current time of point, 17 an estimated bandwidth calculator for calls having a fixed-speed traffic property which judges a call requesting admission has a fixed-speed traffic property when Ra=Rp and which calculates estimated bandwidth VX for all calls having a fixed-speed traffic property and allocated to the transmission line, and 18 a call admission judging portion for judging whether a call requesting admission is to be accepted or rejected with consideration of the estimated total bandwidths V for calls having a variable-speed traffic property and the estimated bandwidth VX for calls having a fixed-speed traffic property, respectively, and the physical bandwidth Z of the transmission line.

The average.peak cell rate comparator 11 judges that a call requesting admission has a variable-speed traffic property when the average cell rate Ra and the peak cell rate Rp which are declared by the user are different, and the traffic class judging portion 12 determines the traffic class to which the call belongs on the basis of the peak cell rate. The required bandwidth calculator 13 obtains the required bandwidth for guaranteeing the quality on the basis of the sum of the average rate of the call requesting admission and the average cell rates of all the calls that belong to the traffic class to which the call requesting admission belongs and that are already allocated to a transmission line, and outputs the obtained required bandwidth as the estimated bandwidth. The estimated bandwidth calculator 16 for calls having a variable-speed traffic property calculates the estimated total bandwidth V for all the traffic classes, and the call admission judging portion 18 judges whether or not the sum of the estimated bandwidth VX and the total estimated bandwidth V for all the calls having a variable-speed traffic property is smaller than the physical bandwidth Z, and if the answer is in the affirmative, the call admission judging portion 18 accepts the call, while rejecting the call if the answer is in the negative.

In this case, the required bandwidth which satisfies the required cell loss ratio is registered in a table in advance for each traffic class in correspondence with the sum of the average cell rates in the classified required bandwidth storage portion 14, and the required bandwidth calculator 13 obtains the required bandwidth from the table. Alternatively, it is possible to register the permissible utilization factor $f_i$ ($\leq 1$) which guarantees the required cell loss ratio in correspondence with the sum of the average cell rates in a table, to obtain the permissible utilization factor $f_i$ from the table and then obtain the required bandwidth by dividing the sum of the average cell rates by the permissible utilization factor $f_i$.

The average.peak cell rate comparator 11 judges that the call requesting admission has a fixed-speed traffic property when the average cell rate Ra and the peak cell rate Rp which are declared by the user are coincident with each other, and the estimated bandwidth calculator 17 for calls having a fixed-speed traffic property calculates the estimated bandwidth VX of all the calls having a fixed-speed traffic property that are allocated to the transmission line, and the call admission judging portion 18 judges whether or not the sum of the estimated bandwidth VX and the estimated total bandwidth V for all the calls having a variable-speed traffic property is smaller than the physical bandwidth Z, and if the answer is in the affirmative, the call admission judging portion 18 accepts the call, while rejecting the call if the answer is in the negative.

In this manner, it is possible to allocate different bandwidths to a call having a burst traffic property (variable-speed traffic property) and a call having a fixed-speed traffic property. In addition, when a call having a burst traffic property is accepted, it is possible to calculate the required bandwidth which can guarantee the QOS such as the cell loss ratio and allocate a bandwidth to the call approximately on the basis of the average cell rate. As a result, it is possible to allocate many calls to the transmission line while guaranteeing the quality of service such as a cell loss ratio, thereby enhancing the utilization of the transmission line.

Since the required bandwidth for each traffic class is registered in advance in a table in correspondence with the sum of the average cell rates, it is possible to calculate the sum V of the estimated bandwidths for all the traffic classes by a simple operation and to judge whether or not th transmission line has a vacant bandwidth which is necessary for accepting the call requesting admission.

In addition, the worst burst traffic model in which the cell loss ratio becomes worst is created on the basis of the peak cell rate, and the required bandwidth which satisfies the required cell loss ratio is determined on the basis of the worst burst traffic model and registered in a table for each traffic class in correspondence with the sum of the average cell rates. When there is a call having a variable-speed traffic property, the required bandwidth for guaranteeing the QOS is obtained by using the table on the assumption that a call of the worst burst traffic model which corresponds to the peak cell rate of the call has occurred. In this manner, it is possible to prevent the actual total bandwidth of all the calls allocated to the transmission line from exceeding the capacity of the transmission line by the above-described connection admission control method.

If the required bandwidth of the traffic class to which a call requesting admission belongs is compared with the sum of the peak cell rates (bandwidths) of the calls which belong to that traffic class, and the smaller bandwidth is regarded as the estimated bandwidth of the traffic class, it is possible to estimate the total bandwidth of all the calls allocated to the transmission line more appropriately and at a small value, thereby effectively utilizing the transmission line.

Alternatively, the required bandwidths which satisfy first and second cell loss ratios, respectively, are registered in a table in correspondence with the sum of the average cell rates. Every time there is a call, a first required bandwidth is obtained from the table in which the cell loss ratio is stricter. A required bandwidth is also obtained from the table which corresponds to the cell loss ratio declared by the user or determined by the network, and then a second required bandwidth is obtained by computing the sum of the required bandwidths for the respective cell loss ratios. Thereafter, the first required bandwidth and the second required bandwidth are compared with each other, and if the former is smaller than the latter, the first required bandwidth is determined as the estimated bandwidth. In this manner, it is possible to estimate the total bandwidth of all the calls allocated to the transmission line more appropriately and at a small value, thereby effectively utilizing the transmission line.

In addition, it is possible to compare the sum of the estimated bandwidths determined for the respective traffic classes with the total estimated bandwidth which is obtained without classification depending upon the traffic class on the assumption that all the calls belong to one traffic class. If the latter is smaller than the former, the latter required bandwidth is determined as the estimated total bandwidth of all the calls that are allocated to the transmission line. In this manner, it is possible to estimate the total bandwidth of all the calls allocated to the transmission line more appropriately and at a small value, thereby effectively utilizing the transmission line.

(B) Connection admission control (a) Connection admission control (CAC)

Figure 2:
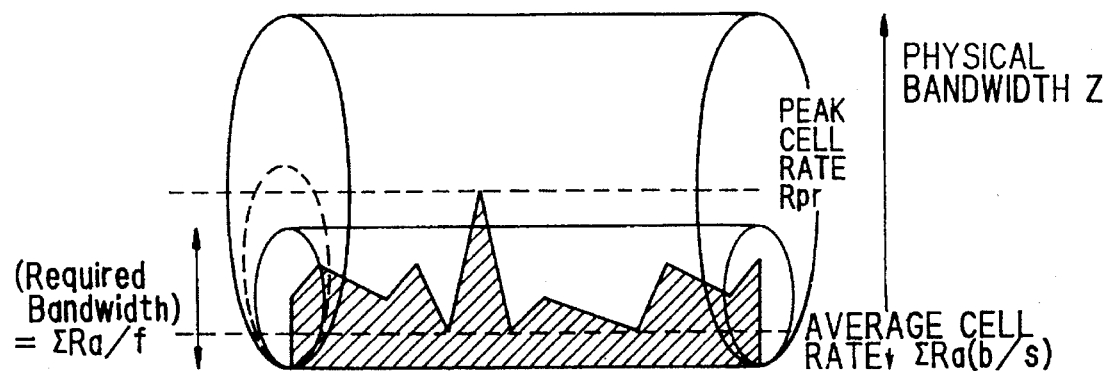
FIG. 2 an explanatory view of a CAC control according to the present invention.

FIG. 2 explains a CAC system according to the present invention.

In order to expect the statistical multiplexing effect of an ATM, the CAC algorithm of the present invention uses two simple parameters, peak cell rate (Rp) and average cell rate (Ra) as the parameters declared by the user. Basically in the CAC algorithm of the present invention, the bandwidth which can guarantee the prescribed cell loss ratio is calculated by using $f(\Sigma Ra)$ when the sum of the average cell rates is $\Sigma Ra$, wherein $f(\Sigma Ra)$ is the permissible utilization factor for guaranteeing the prescribed cell loss ratio when the sum of the average cell rates is $\Sigma Ra$. In other words, it can be said that when the sum of the average cell rates of the calls which are allocated to the transmission line is $\Sigma Ra$, it is possible to guarantee the prescribed cell loss ratio if there is a vacant bandwidth $\Sigma Ra/f(\Sigma Ra)$ in the transmission line. This means that on the assumption that the required bandwidth $\Sigma Ra/f(\Sigma Ra)$ is allocated to the transmission line when the sum of the average cell rates of all the calls (including a call requesting admission) that are allocated to the transmission line is $\Sigma Ra$, the call requesting admission is to be accepted when $Z > \Sigma Ra/f(\Sigma Ra)$ and to be rejected when $Z > \Sigma Ra/f(\Sigma Ra)$, wherein Z represents the bandwidth of the transmission line.

As shown in FIG. 2, it is assumed that sum of the average cell rates of all the calls (including a call requesting admission) that are allocated to the transmission line is $\Sigma Ra$ and the maximum value of the sums of the peak cell rates of all cells is the peak cell rate Rpr. If the required bandwidth $\Sigma Ra/f(\Sigma Ra)$ is determined by the permissible utilization factor $f(\Sigma Ra)$, even if the peak cell rate Rpr exceeds the required bandwidth $\Sigma Ra/f(\Sigma Ra)$, the actual cell loss ratio does not exceed the prescribed value such as $1/10^7$ (one error cell out of $10^7$ cells), thereby guaranteeing the prescribed cell ratio. Accordingly, on the assumption that the required bandwidth $\Sigma Ra/f(\Sigma Ra)$ is allocated to the transmission line, the required bandwidth is compared with the bandwidth Z of the transmission line, and when $Z > \Sigma Ra/f(\Sigma Ra)$, the call requesting admission is accepted, while it is rejected when $Z < \Sigma Ra/f(\Sigma Ra)$.

If the permissible utilization factor $f(\Sigma Ra)$ is reduced, the required bandwidth $\Sigma Ra/f(\Sigma Ra)$ increases, as indicated by the dot ellipse in FIG. 2; the increase of the required bandwidth $\Sigma Ra/f(\Sigma Ra)$ beyond the peak cell rate Rpr is ensured. However, the smaller the permissible utilization factor, the larger the required bandwidth $\Sigma Ra/f(\Sigma Ra)$ becomes, so that it exceeds the bandwidth Z of the transmission even a few calls are allocated, thereby lowering the utilization. It is therefore necessary to appropriately determine the permissible utilization factor $f(\Sigma Ra)$. A method of determining the permissible utilization factor $f(\Sigma Ra)$ will be explained in the following.

(b) Characteristics of burst traffic

Figure 3:
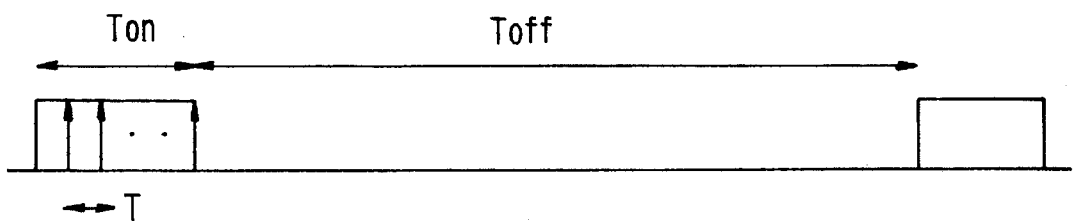
FIG. 3 is an explanatory view of a burst traffic model.

An on-off type burst model is used in order to determine the permissible utilization factor $f(\Sigma Ra)$ with easiness in handling burst traffic. The on-off type burst model is characterized by three parameters Ton, Toff and T, as shown in FIG. 3, the parameter Ton represents a burst-on period (sec), which follows the exponential distribution of the average Ton, Toff represents a burst-off period (sec), which follows the exponential distribution of the average Toff, and T the minimum cell interval (sec), which changes with the peak cell rate. When the burst model is characterized as shown in FIG. 3, the peak cell rate (peak cell rate) Rp is represented by the following formula:

peak cell rate $Rp=53\times 8/T$ (53 is the number of byes of one cell), and the average cell rate Ra is represented by the following formula:

average cell rate $Ra=Rp\times Ton/(Ton+Toff)$.

Figure 4:
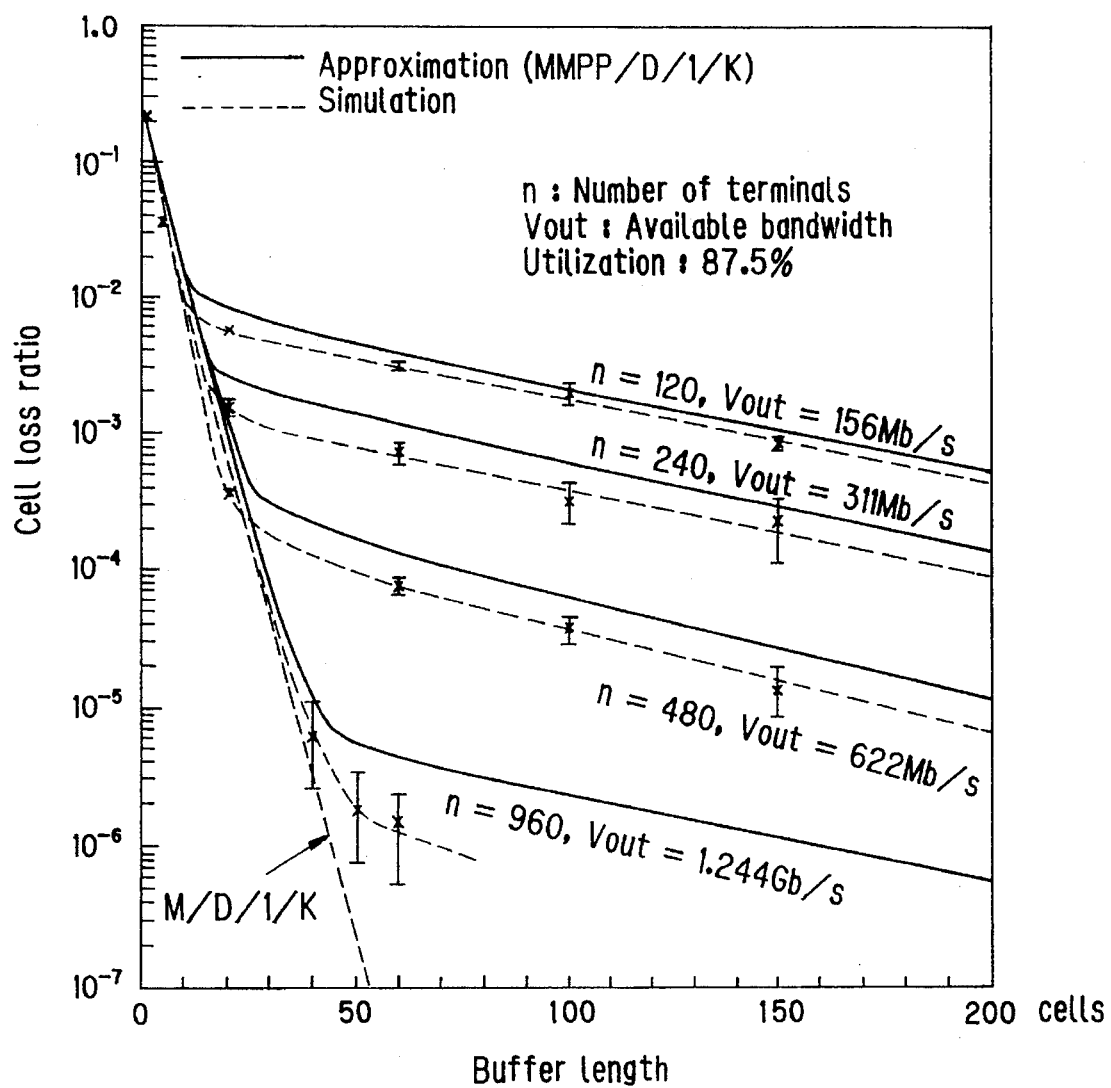
FIG. 4 shows the relationship between the cell loss ratio and the buffer length of an on-off type burst traffic cell.
Figure 5:
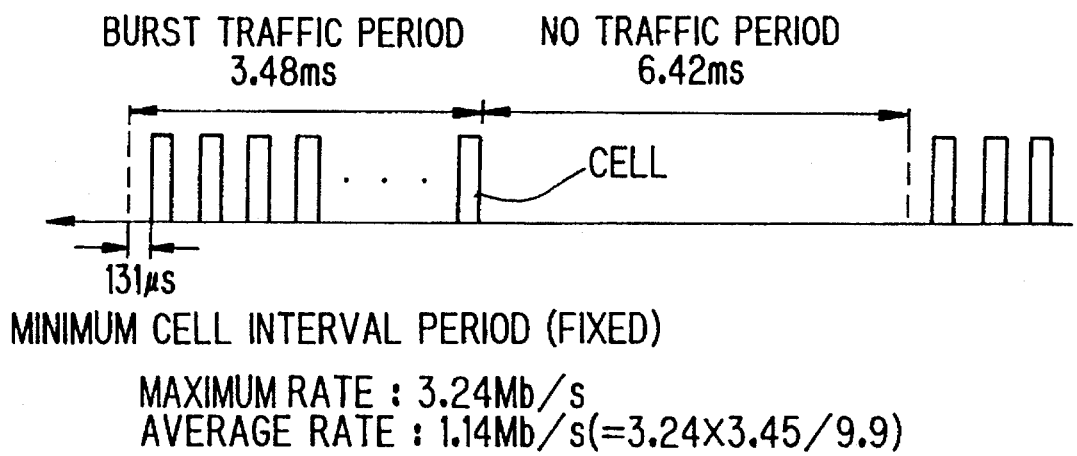
FIG. 5 is an explanatory view of a burst model.

When the cells are input to a ATM network system in the manner of such on-off type burst traffic model, the logarithm of the cell loss ratio represented by log[cell loss ratio] linearly reduces with respect to the length (K) of a buffer provided in the ATM network system, if the buffer length is short. However, the log[cell loss ratio] is not reduced in proportion to an increase in the buffer length K if the buffer length exceeds some point. This point is called a knee point. FIG. 4 shows the relationship between the log[cell loss ratio] and the buffer length, in which the symbol n represents the number of the input lines of the ATM network system (the number of multiplexed calls) and Vout the available bandwidth of the transmission line. In FIG. 4, various characteristic are shown when the number n of multiplexed calls and the available bandwidth Vout of the transmission line are varied while the permissible utilization factor fi is set at a constant value 0.875. In the case of random traffic, it is possible to calculate the cell loss ratio by using an M/D/1/K model. FIG. 5 shows a call having a burst traffic property which is input to one buffer from n input lines and output to one output line from the buffer at the speed of the transmission line.

As is clear from FIG. 4, the larger the number n of multiplexed calls becomes, the knee point moves downward, so that the cell loss ratio is improved. This is because the larger the number n of multiplexed calls becomes, the more peaks and bottoms of the cell rates of the calls overlap each other and the more levelled the transmission speeds become due to a statistical multiplex effect. When the peak cell rate Rp of a call having burst traffic property is high, the number of multiplexed calls reduces, and the knee point moves upward, so that even if the buffer length is increased, the effect is not enhanced in proportion to the increase. The knee point is a function of the peak cell rate Rp, the physical bandwidth S and the number of cells in the period of Ton. As a result of investigation, it has been observed that the largest factor of the knee point is the peak cell rate Rp.

It is now assumed that calls having a burst traffic property are classified on the basis of the peak cell rate Rp, the required bandwidth $\Sigma Ra/f(\Sigma Ra)$ is obtained for each class and the sum of the required bandwidths for all classes is allocated to the transmission line. The total required bandwidth (estimated total bandwidth) is compared with the bandwidth Z of the transmission line, and if Z>the estimated total bandwidth, a call requesting admission is accepted, while it is rejected if Z<the estimated total bandwidth. More specifically, each burst traffic call is classified into traffic classes on the basis of the peak cell rate Rp. If it is assumed that the average cell rate of the traffic of a traffic class i (i=1, 2, ...) is Rai, the permissible utilization factor of the traffic class is $fi(\Sigma Rai)$. The final judgement of the CAC as to whether a call is accepted or rejected is made by the following formula (1):

$$\Sigma Ra1/f1(\Sigma Ra1) + \Sigma Ra2/f2(\Sigma Ra2) + \ldots + \Sigma Ran/fn(\Sigma Ran) \leq Z \quad (1)$$

wherein $\Sigma Rai/fi(\Sigma Rai)$ represents the required bandwidth for the traffic class i which can guarantee the required QOS (Quality of Service) such as the cell loss ratio. If the left side of the formula (1) is not more than the physical bandwidth Z, the call requesting admission is accepted, while it is rejected when the left side of the formula (1) is more than the physical bandwidth Z.

(c) Reference on-off traffic model

A method of determining a reference on-off traffic model which is important for determining the permissible utilization $fi(\Sigma Rai)$ will now be explained.

As shown in FIG. 3, the burst model is specified by the three parameters Ton, Toff and T. Since T is a reciprocal of the peak cell rate Rp, the remaining two parameters are a burst-on period Ton and a burst-off period Toff.

Figure 6:
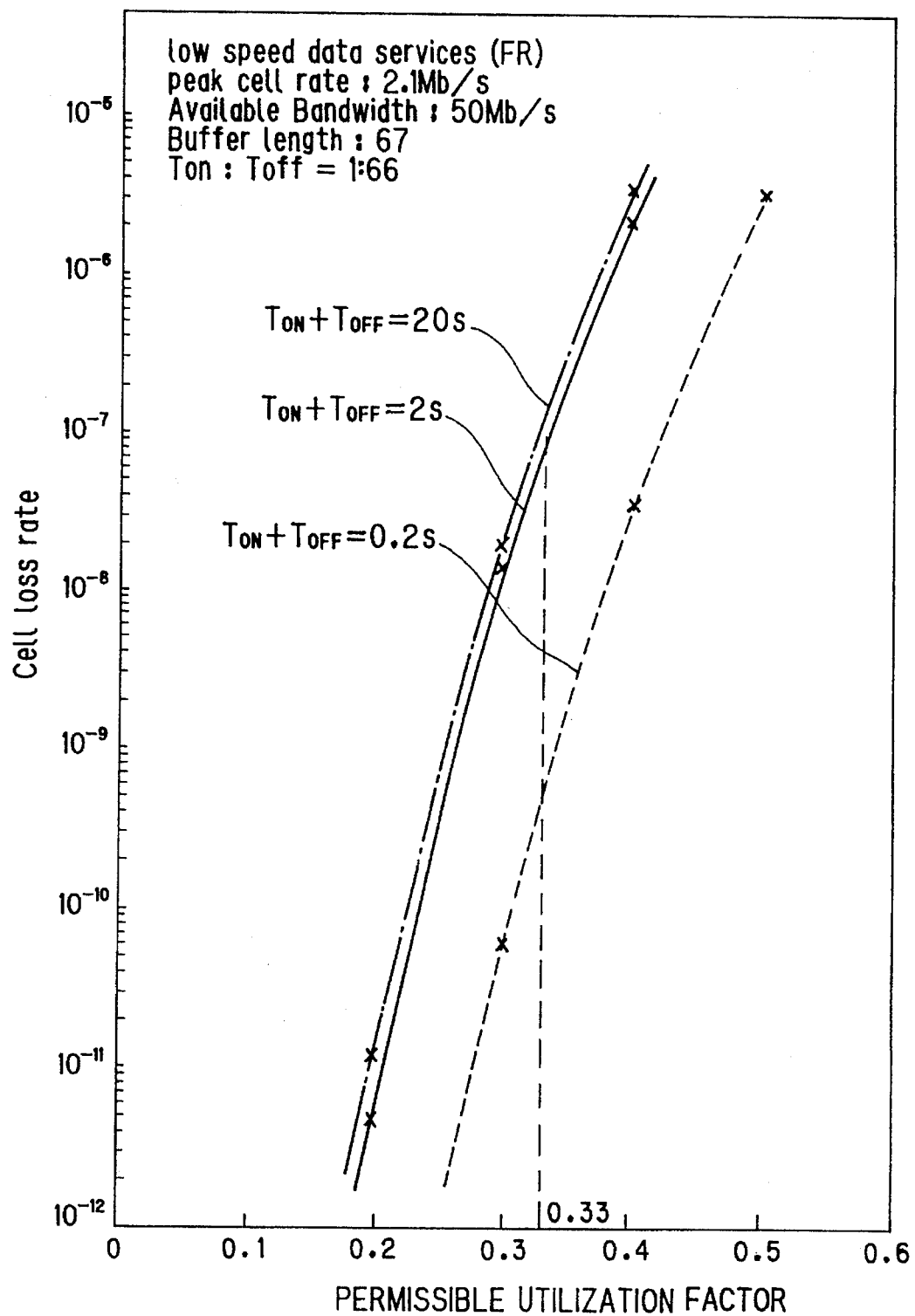
FIG. 6 is the first characteristic curve of (cell loss ratio)–(permissible utilization factor)
Figure 7:
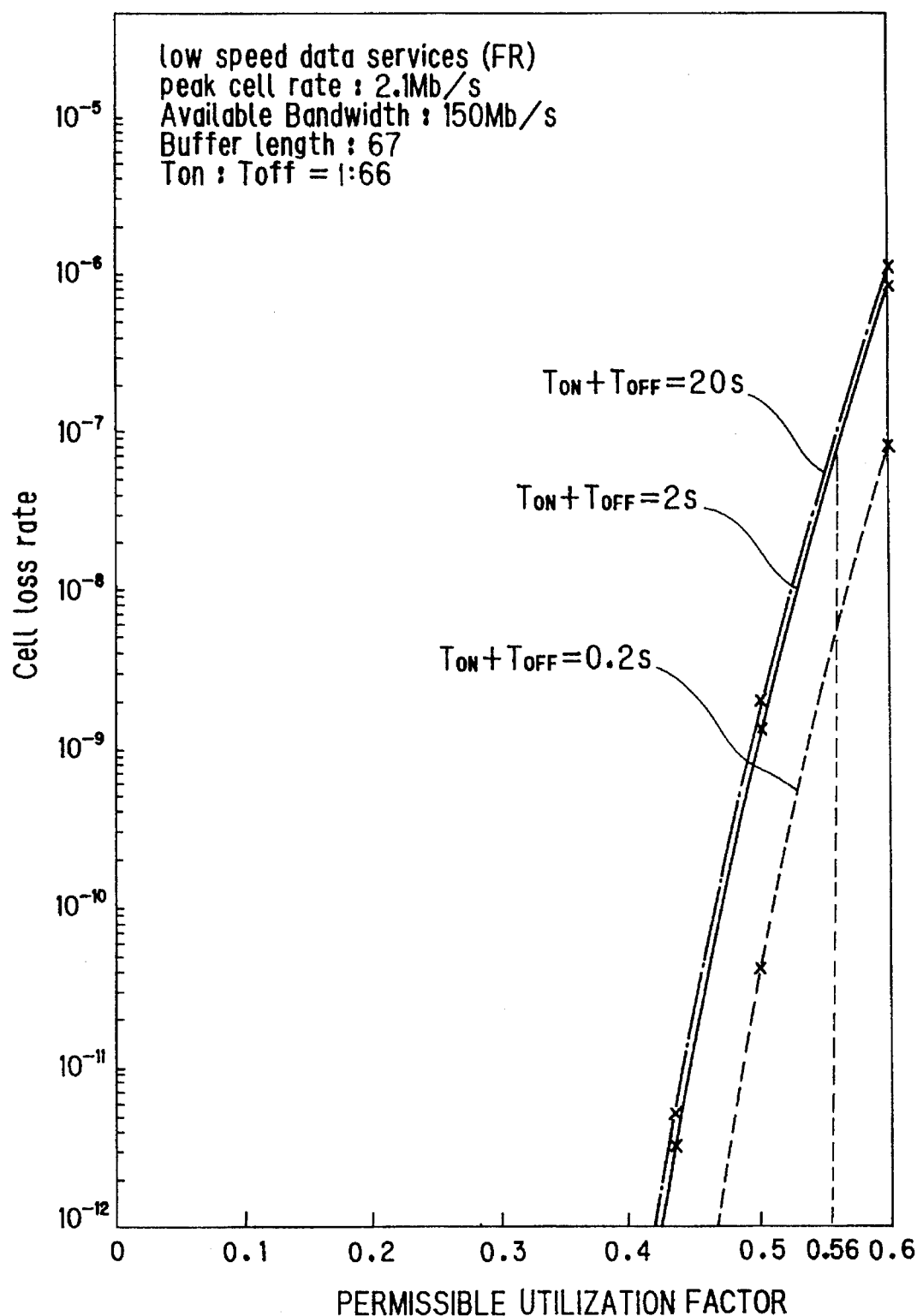
FIG. 7 is the second characteristic curve of (cell loss ratio)–(permissible utilization factor)

If Ton/(Ton+Toff) is constant, the longer (Ton+Toff) is, the more cells generally flow into the switching system, so that the cell loss ratio (CLR) is increased. FIGS. 6 and 7 are characteristic curves of (cell loss ratio)-(permissible utilization factor) when (Ton+Toff) is 0.2 sec, 2 sec and 20 sec. In FIG. 6, the peak cell rate Rp is 2.1 Mb/s (low-rate like frame relay service), the available bandwidth of the transmission line is 50 Mb/s, the buffer length is 67 cells, and Ton: Toff=1:66. In FIG. 7, the peak cell rate Rp is 2.1 Mb/s (low-rate frame relay service), the available bandwidth of the transmission line is 150 Mb/s, the buffer length is 67 cells, and Ton: Toff=1:66.

As is clear from these drawings, if the permissible utilization factor is reduced, the cell loss ratio is reduced, while the cell loss ratio is increased, if the permissible utilization factor is increased. It is necessary to reduce the permissible utilization factor for obtaining the same cell loss ratio, for example, $1/10^7$ in proportion to an increase in (Ton+Toff). When (Ton+Toff) becomes not less than 2 sec, there is not a great difference between the permissible utilization factors of 2 sec and 20 sec for the purpose of obtaining the same cell loss ratio. In other words, when (Ton+Toff)) is not less than 2 sec, the permissible utilization factor for obtaining the same cell loss is almost uniform.

From the above-described investigation, it is observed that (Ton+Toff) must-be long in order to keep the cell loss ratio on the safe side. However, if (Ton+Toff) is long, the amount of hardware in the ATM network system increases. To prevent this, and from the fact that when (Ton+Toff)) is not less than 2 sec, the permissible utilization factor for obtaining the same cell loss is almost uniform, (Ton+Toff) is set to 2 sec.

It is obvious from FIGS. 6 and 7 that the larger the available bandwidth of the transmission line, the larger the permissible utilization factor for obtaining the same cell loss ratio. This is because the larger is the bandwidth of the transmission line, the more is it possible to increase the number of multiplexed calls, so that the statistical multiplex effect is produced.

Figure 8:
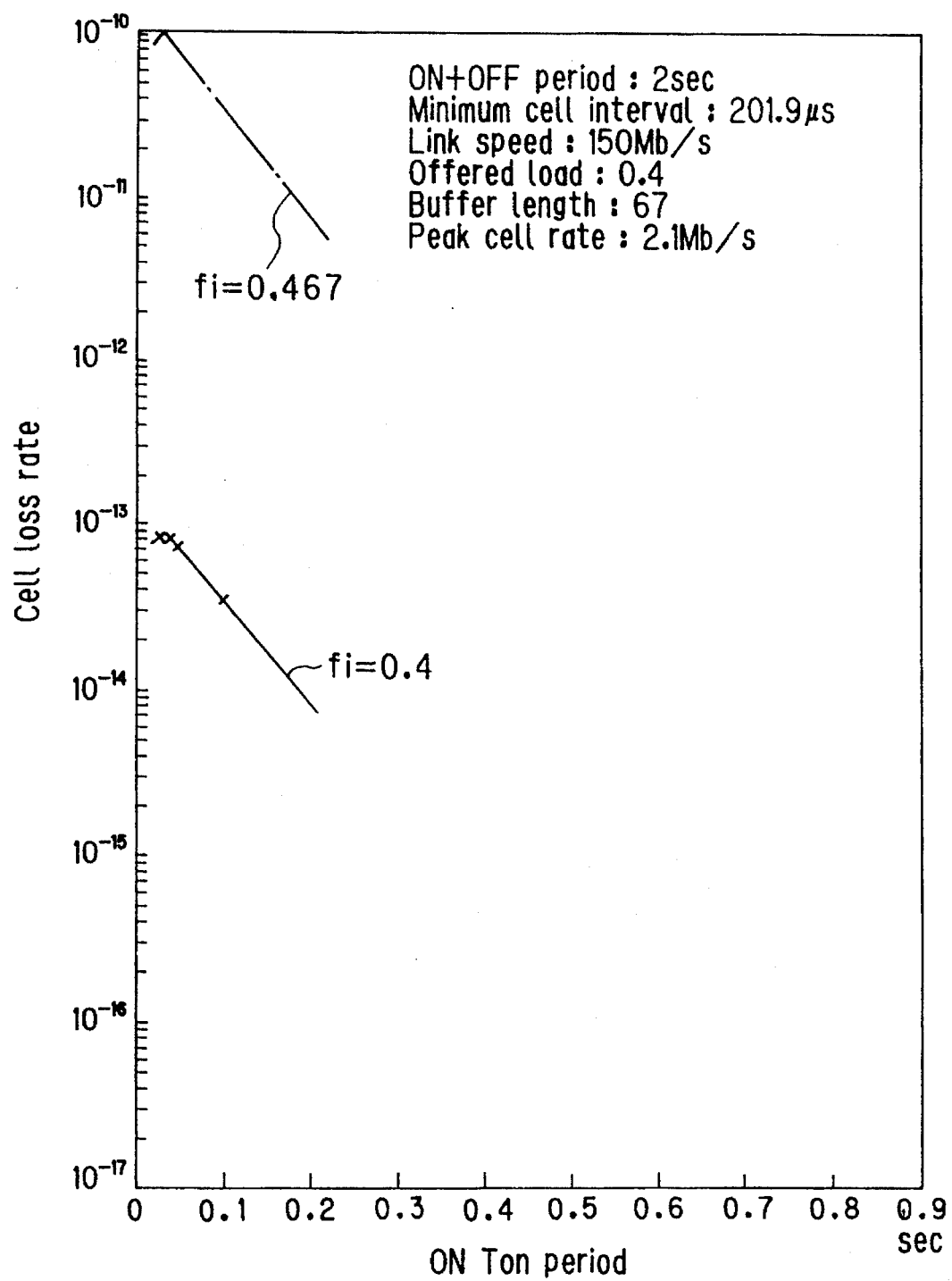
FIG. 8 is the first characteristic curve of (cell loss ratio)–Ton.
Figure 9:
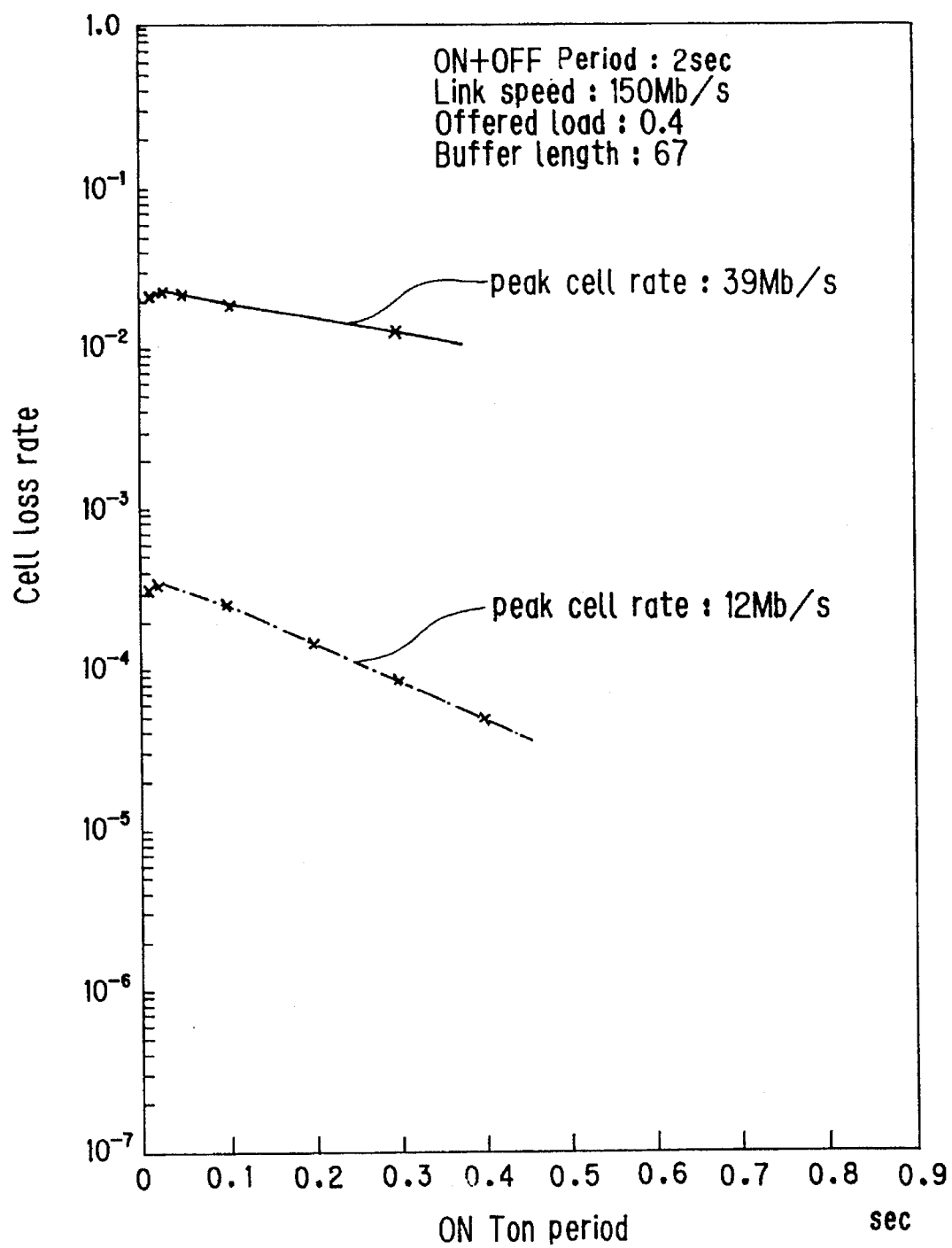
FIG. 9 is the second characteristic curve of (cell loss ratio)–Ton.

It is then necessary to determine the ratio Ton/(Ton +Toff). FIGS. 8 and 9 are characteristic curves of the cell loss ratio and Ton when the permissible utilization factor is constantly 0.4. In FIG. 8, (Ton+Toff) is 2 sec, the bandwidth of the transmission line is 150 Mb/s, the buffer length is 67 cells, and the peak cell rate Rp is 2.1 Mb/s. In FIG. 9, (Ton+Toff) is 2 sec, the bandwidth of the transmission line is 150 Mb/s, the buffer length is 67 cells, and the peak cell rate Rp is 12 Mb/s, 39 Mb/s.

As is clear from FIGS. 8 and 9, there is a Ton period of about 0.02 to 0.03 sec when the cell loss ratio is the highest even if the permissible utilization factor is constant. An on-off model having this Ton is considered to be the worst or an approximately worst burst traffic model. Therefore, such an on-off model is used as a reference on-off model in order to obtain the permissible utilization factor.

When the permissible utilization factor is large, the cell loss ratio increases (see FIGS. 6 and 7), so that if the permissible utilization factor is made larger than 0.4 for example, if it is increased to 0.467, the graph showing the relationship between the cell loss ratio and Ton is moved upward as indicated by one dot-one dash line in FIG. 8.

FIG. 10 shows a reference on-off model of each traffic type.

FIG. 10A shows a reference on-off model when the peak cell rate Rp is 2.1 Mb/s (low-rate frame relay service), the cell length in the Ton period is 148 cells, and the average cell rate Ra is 31.5 kb/s(=148×53× 8/2). In FIG. 10A, Ton= 0.03(s), Toff=1.97(s), and T =201.9/10$^6$(s) (=53×8/2.1×10$^6$).

FIG. 10B shows a reference on-off model when the peak cell rate Rp is 12 Mb/s (middle-rate data service), the cell length in the Ton period is 566 cells, and the average cell rate Ra is 120 kb/s(=566×53×8/2). In FIG. 10B, Ton=0.02(s), Toff=1.98(s), and T=35.3/10$^6$(s).

FIG. 10C shows a reference on-off model when the peak cell rate Rp is 39 Mb/s (high-rate data service like SMDS), the cell length in the Ton period is 2299 cells, and the average cell rate Ra is 487.5 kb/s(=2299×53×8/2). In FIG. 10C, Ton=0.025(s), Toff=1.975(s), and T=10.87/10$^6$(s).

Actually, burst traffic is classified into 10 traffic classes in accordance with the peak cell rate, as shown in FIG. 11, and a reference on-off model is assumedly predetermined for each traffic class. The grade of traffic class increases with an increase in the peak cell rate. That is, when the peak cell rate Rp is not more than 2.1 Mb/s, the traffic class is 1, when the peak cell rate Rp is between 2.1 Mb/s and 7.02 Mb/s, the traffic class is 2, ... when the peak cell rate Rp is between 299.52 Mb/s and 599.042 Mb/s, the traffic class is 10.

(d) Permissible utilization factor

FIG. 12 is a table showing the permissible utilization factor when a reference on-off model is assumedly predetermined in each traffic class on the assumption that the buffer capacity is 67 cells. The permissible utilization factor $fi(\Sigma Rai)$ when only calls of a low-rate data service (peak cell rate Rp=2.1 Mb/s) are multiplexed under the conditions that the required cell loss ratio is 1/10 and the physical bandwidth Z is 150 Mb/s is 0.560. That the permissible utilization is 0.560 means that when the sum $\Sigma Rai$ of the average cell rate is 84 Mb/s, the required bandwidth is 150 Mb/s (=84/0.560), and that if this required bandwidth is vacant in the transmission line, it is possible to satisfy the required cell loss ratio of $1/10^7$ even if a call is accepted.

The value 0.560 can be read from FIG. 7. When the required cell loss ratio is $1/10^{10}$, the permissible utilization factor is 0.467, and this value can also be read from FIG. 7. That the permissible utilization factor is 0.467 means that when the sum $\Sigma Rai$ of the average cell rates is 70 Mb/s, if the required bandwidth is 150 Mb/s (=70/0.467), it is possible to satisfy the required cell loss ratio of $1/10^{10}$.

The permissible utilization factor fi($\Sigma Rai$) when only calls of a low-rate data service (peak cell rate Rp =2.1 Mb/s) are multiplexed under the conditions that the required cell loss ratio is $1/10^7$ and the physical bandwidth Z is 50 Mb/s is 0.330. That the permissible utilization factor is 0.330 means that when the sum $\Sigma Rai$ of the average cell rate is 16.5 Mb/s, the required bandwidth is 50 Mb/s (=16.5/0.330), and that if this required bandwidth is vacant in the transmission line, it is possible to satisfy the required cell loss ratio of $1/10^7$ even if a call is accepted. The value 0.330 can be read from FIG. 6. When the required cell loss ratio is $1/10^{10}$ the permissible utilization is 0.220, and this value can also be read from FIG. 6.

In this manner, it is possible to obtain the required bandwidth $\Sigma Rai/fi(\Sigma Rai)$ with respect to the sum $\Sigma Rai$ of the average cell rates if the relationship between the sum $\Sigma Rai$ of the average cell rates and the permissible utilization factor fi ($\Sigma Rai$) is registered for each peak cell rate (traffic class) and each required cell loss rate in a table.

It is also possible to register the relationship between the sum $\Sigma Rai$ of the average cell rates and the required bandwidth $\Sigma Rai/fi(\Sigma Rai)$ for each peak cell rate (traffic class) and each required peak loss rate in a table. In this case, it is possible to directly obtain the required bandwidth which corresponds to the sum $\Sigma Rai$ of the average cell rates without need for any division for obtaining the required bandwidth $\Sigma Rai/fi(\Sigma Rai)$.

Figure 13:
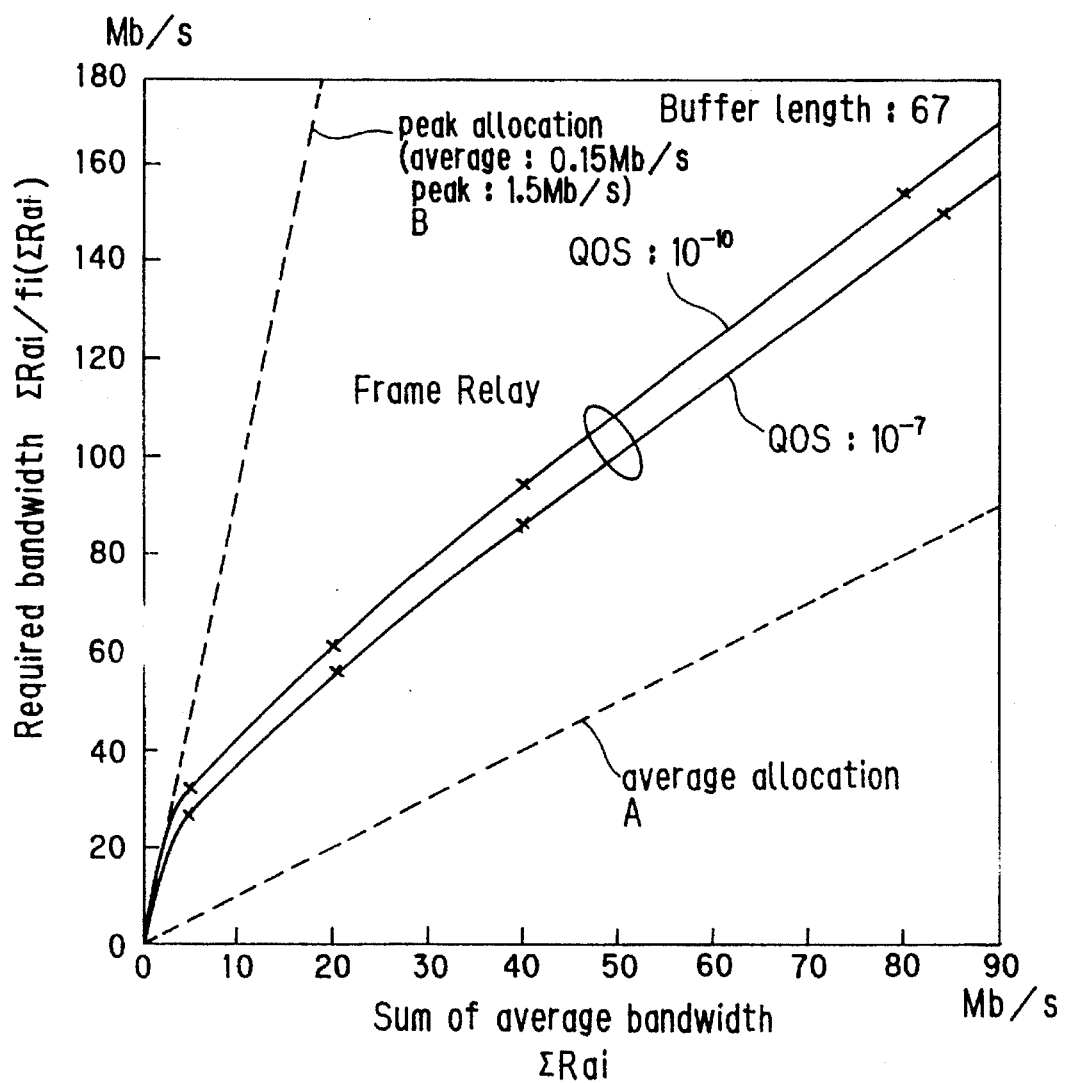
FIG. 13 shows the first relationship between the sum of the average cell rates and the required bandwidth for guaranteeing the quality.
Figure 14:
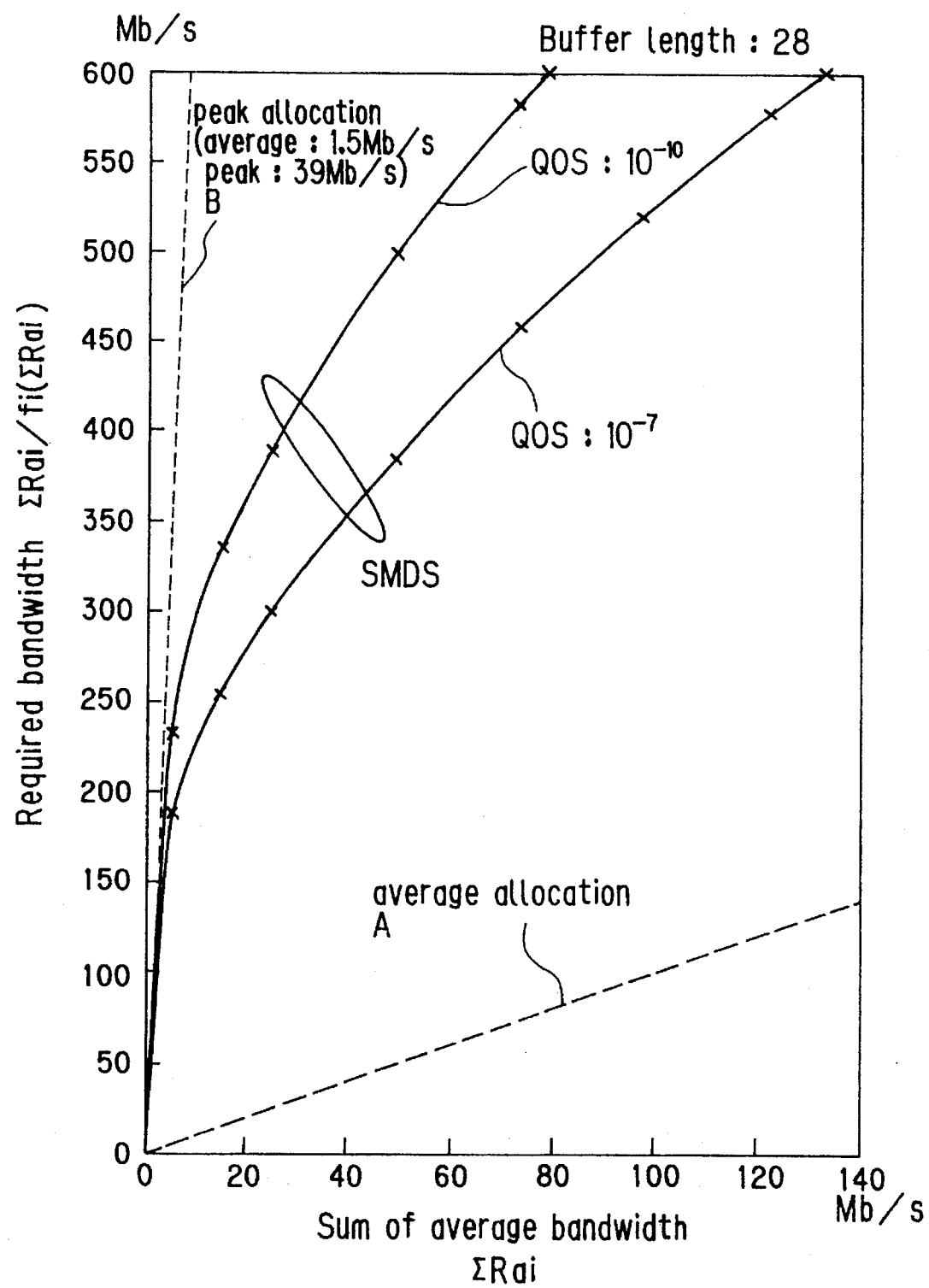
FIG. 14 shows the second relationship between the sum of the average cell rates and the required bandwidth for guaranteeing the quality.

FIGS. 13 and 14 show the relationship between the sum $\Sigma Rai$ of the average cell rates and the required bandwidth $\Sigma Rai/fi(\Sigma Rai)$ when the peak cell rate is 1.5 Mb/s (average cell rate is 0.15 Mb/s) and 39 Mb/s (average cell rate is 1.5 Mb/s), respectively. In each graph, the cell loss ratio is $1/10^7$ and $1/10^{10}$. The broken line A shows the ideal characteristic when calls are allocated on the basis of the average cell rate in which the permissible utilization factor =1, and B the characteristic when calls are allocated on the basis of the peak cell rate.

Figure 15:
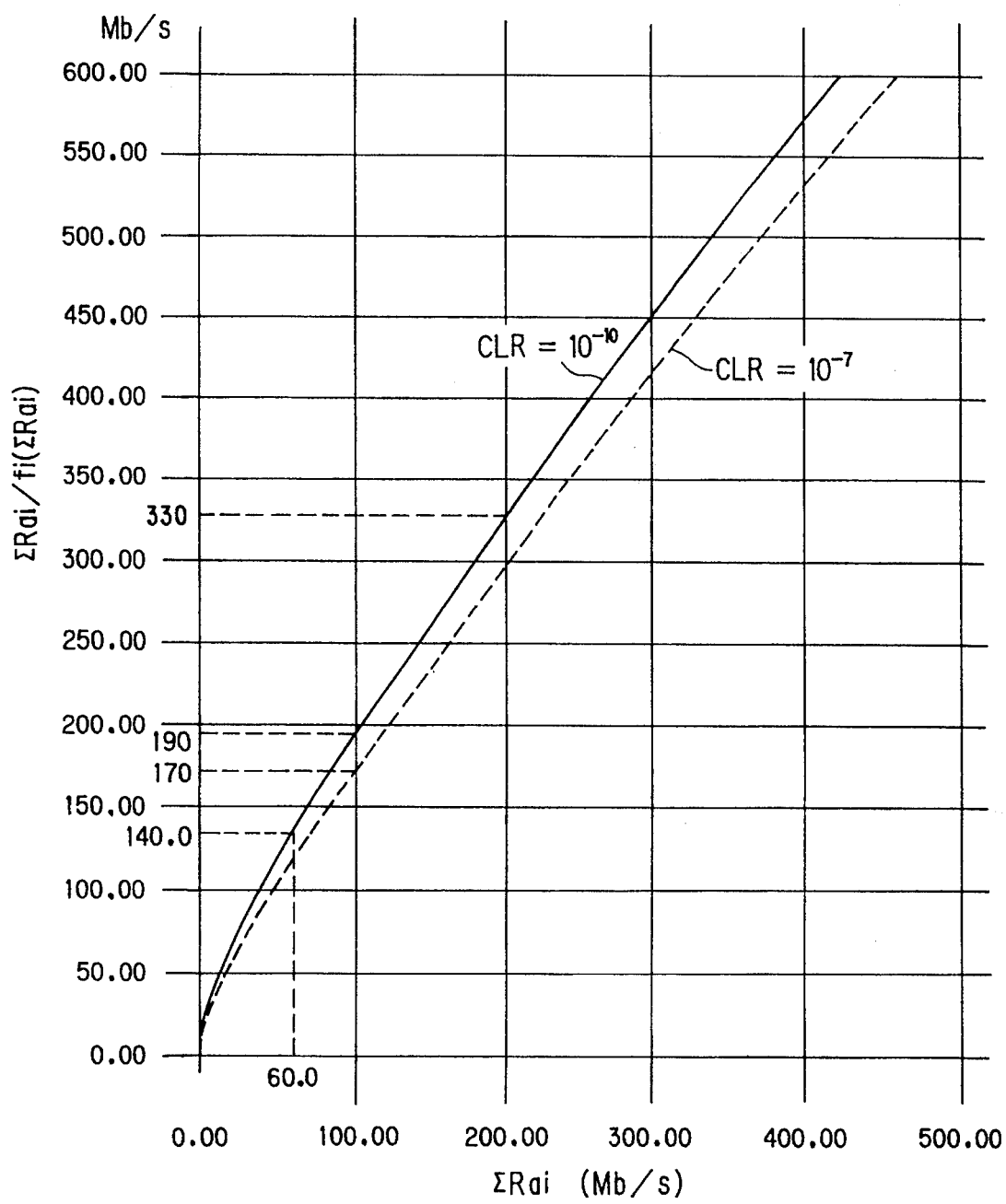
FIG. 15 shows the relationship between the sum of the average cell rates and the required bandwidth for guaranteeing the quality when the traffic class is 1.

FIG. 15 shows the relationship between the sum $\Sigma Rai$ of the average cell rates and the required bandwidth $\Sigma Rai/fi(\Sigma Rai)$ when the traffic class is 1 (the peak cell rate is 2.1 Mb/s, the average cell rate is 31.5 kb/s). In the graph, the cell loss ratio is $1/10^7$ (low class) and $1/10^{10}$ (high class). These relationships are registered in advance in a table of a memory. Since audio data is transmitted at a rate of 64 kb/s, the required bandwidth is registered at an interval of 64 kb/s, which is an average cell rate.

Figure 16:
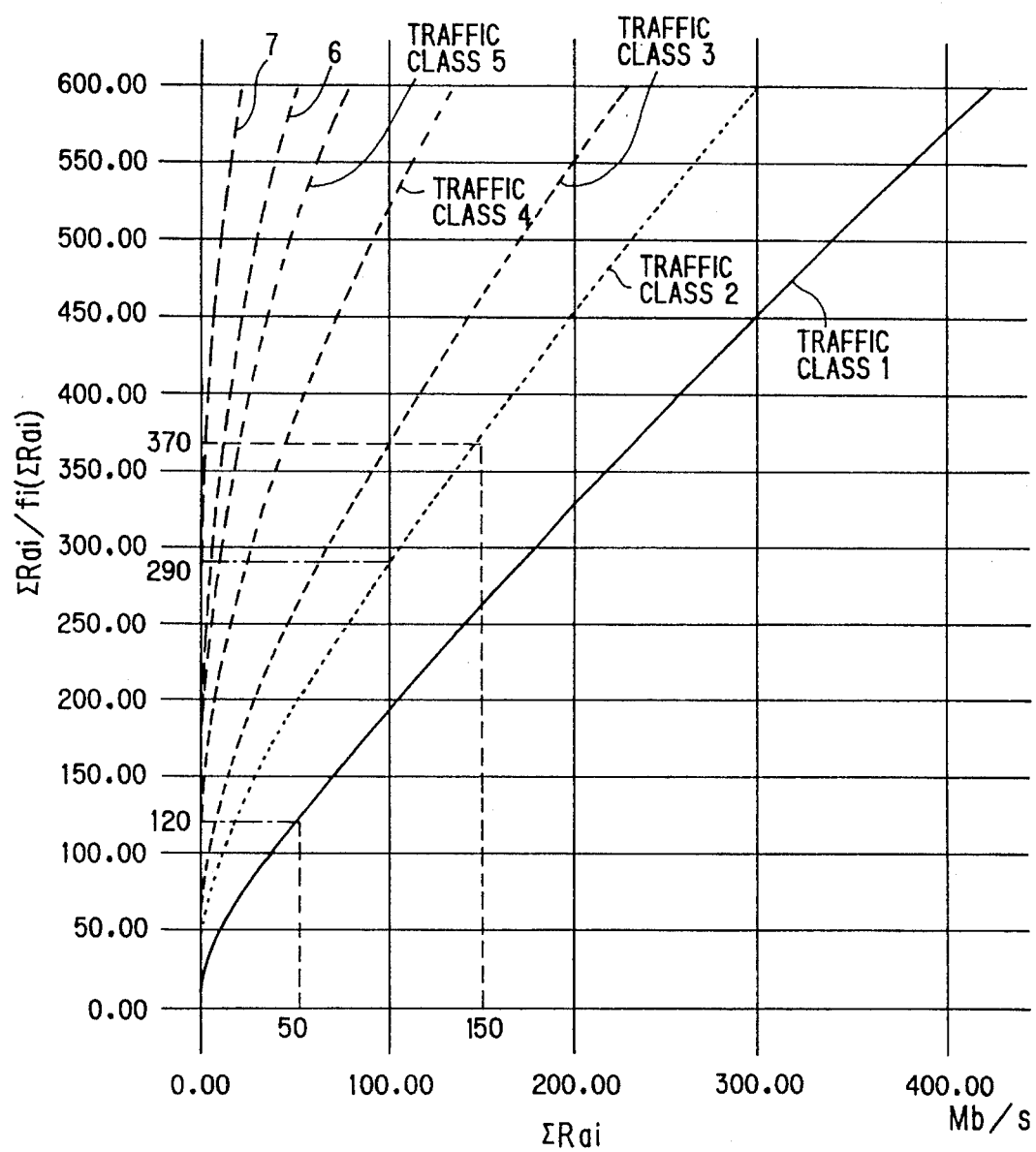
FIG. 16 shows the relationship between the sum of the average cell rates and the required bandwidth for guaranteeing the quality when the traffic classes are 1 to 7.

FIG. 16 shows the relationship between the sum $\Sigma Rai$ of the average cell rates in a high class and the required bandwidth $\Sigma Rai/fi(\Sigma Rai)$ when the traffic classes is 1 to 7 (see FIG. 11). The relationship in the low class is omitted. The relationship between the sum $\Sigma Rai$ of the average cell rates and the required bandwidth $\Sigma Rai/fi(\Sigma Rai)$ both in the high class and in the low class are registered in the table of the memory for each traffic class.

(e) Example of calculation of required bandwidth

In the present invention, when the average cell rate and the peak cell rate of the call declared by the user at the time of calling are different, the call requesting admission is judged to be a call having a variable-speed traffic property, and the traffic class of the call is obtained on the basis of the peak cell rate. The required bandwidth for guaranteeing the QOS is then obtained as an estimated bandwidth on the basis of the sum of the average cell rate of the call requesting admission and the average cell rates of all the calls that belong to the class and that are already allocated to a transmission line. Judgement is then made as to whether or not there is a vacant bandwidth in the transmission line necessary for accepting the call requesting admission, with the sum of the estimated bandwidths for all traffic classes and the physical bandwidth of the transmission line taken into consideration. If the answer is in the affirmative, the call is accepted, while it is rejected, if the answer is in the negative.

Figure 17:
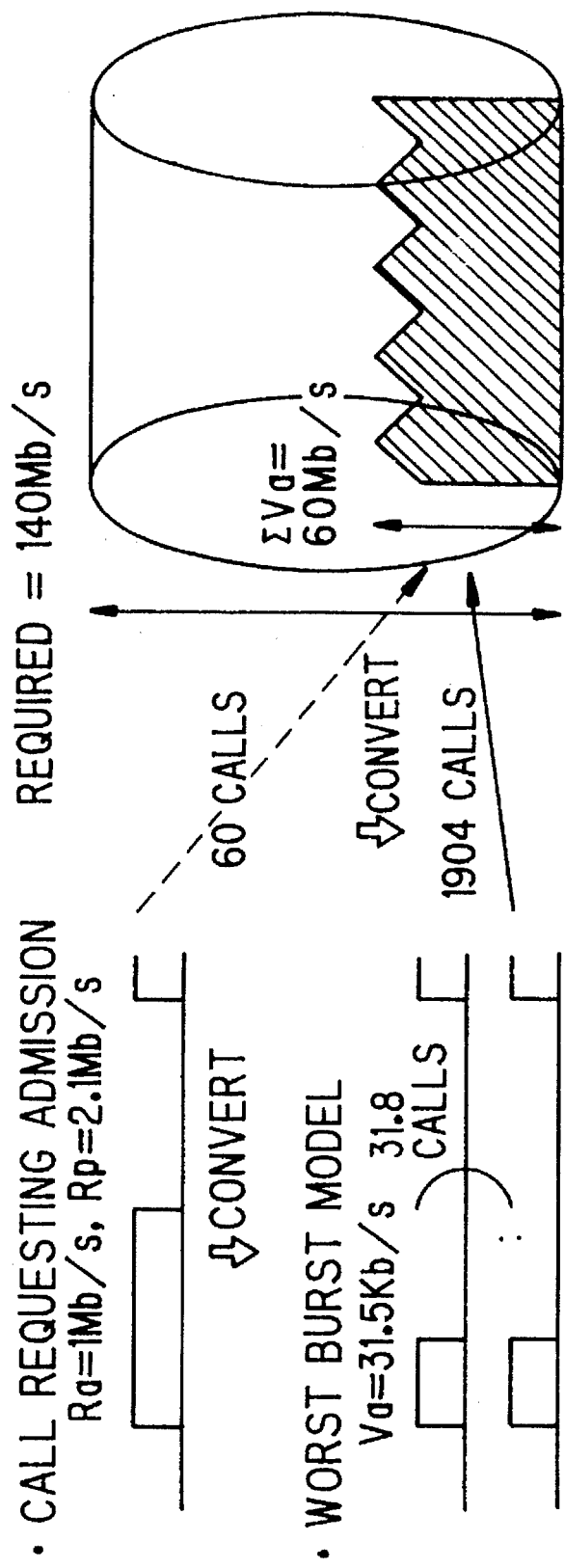
FIG. 17 is an explanatory view of the calculation of a required bandwidth for guaranteeing the quality when the average cell rate is different from the average cell rate of the traffic class.

The peak cell rate Rp and the average cell rate Ra of the reference on-off model for each traffic class are predetermined. However, the average cell rate Ra which is declared by the user sometimes does not agree with the average cell rate of the reference on-off model. FIG. 17 is an explanatory view of the calculation of the required bandwidth when there are 60 calls which have a peak cell rate of 2.1 Mb/s and an average cell rate of 1 Mb/s.

When there is a call requesting admission which has a peak cell rate of 2.1 Mb/s and an average cell rate of 1 Mb/s, the average cell rate of the reference on-off model of the traffic class 1 which corresponds to the call is 31.5 kb/s. Therefore, the call requesting admission is converted into n calls of the worst burst model of the traffic class 1. In this case, since n=31.8 (1000/31.5), the call requesting admission is converted into 31.8 calls of the worst burst model. In this manner, the 60 calls having a peak cell rate of 2.1 Mb/s and an average cell rate of 1 Mb/s correspond to 1904 (=1000.60/31.5) calls of the worst burst model. The sum of the average cell rates of 1904 calls of the worst burst model is 60 Mb/s. The required bandwidth 140 Mb/s which corresponds to the sum 60 Mb/s of the average cell rates is obtained from FIG. 15 (actually from the table).

(C) Structure of ATM network system of the invention

Figure 18:
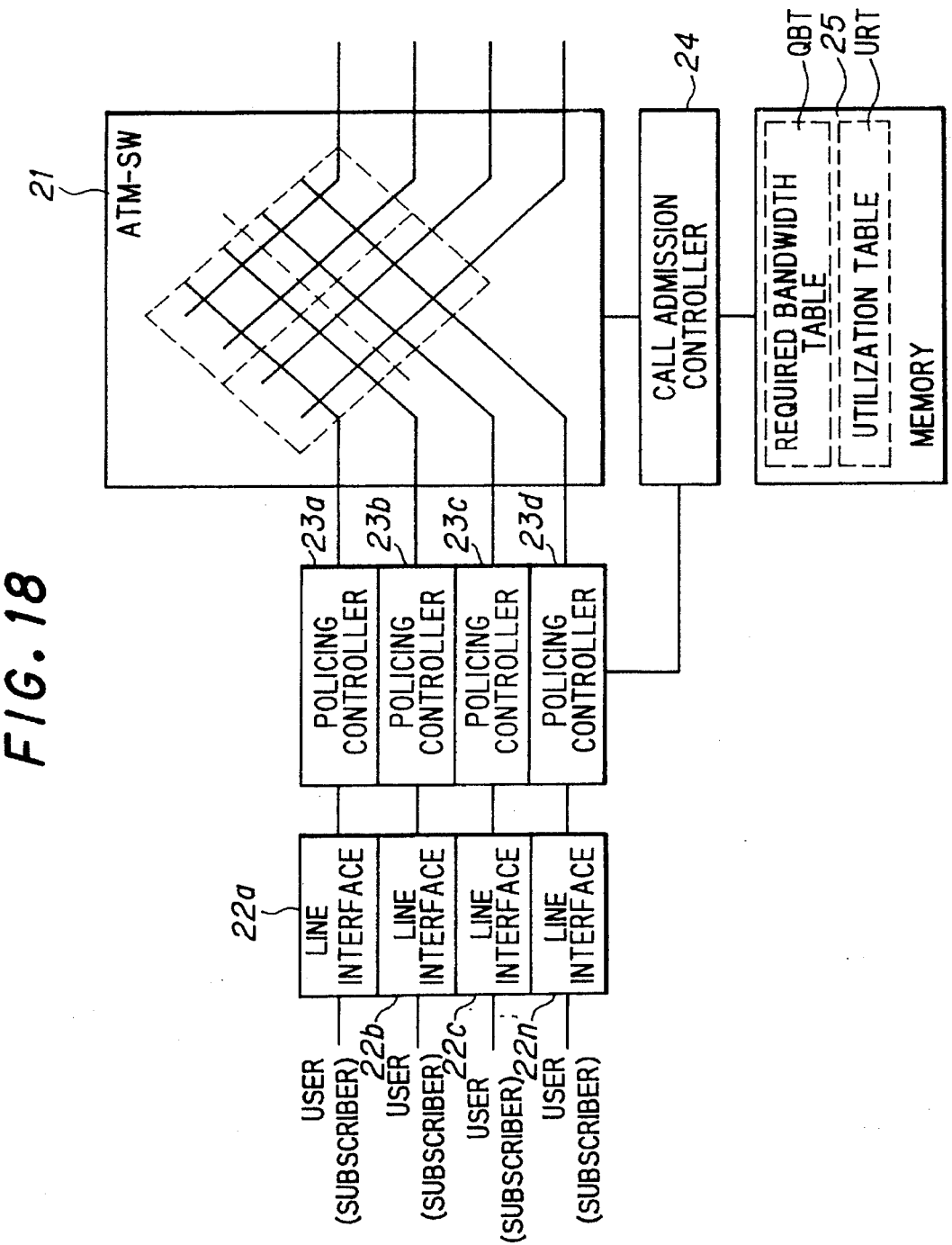
FIG. 18 shows the structure of an ATM network system according to the present invention.
Figure 28:
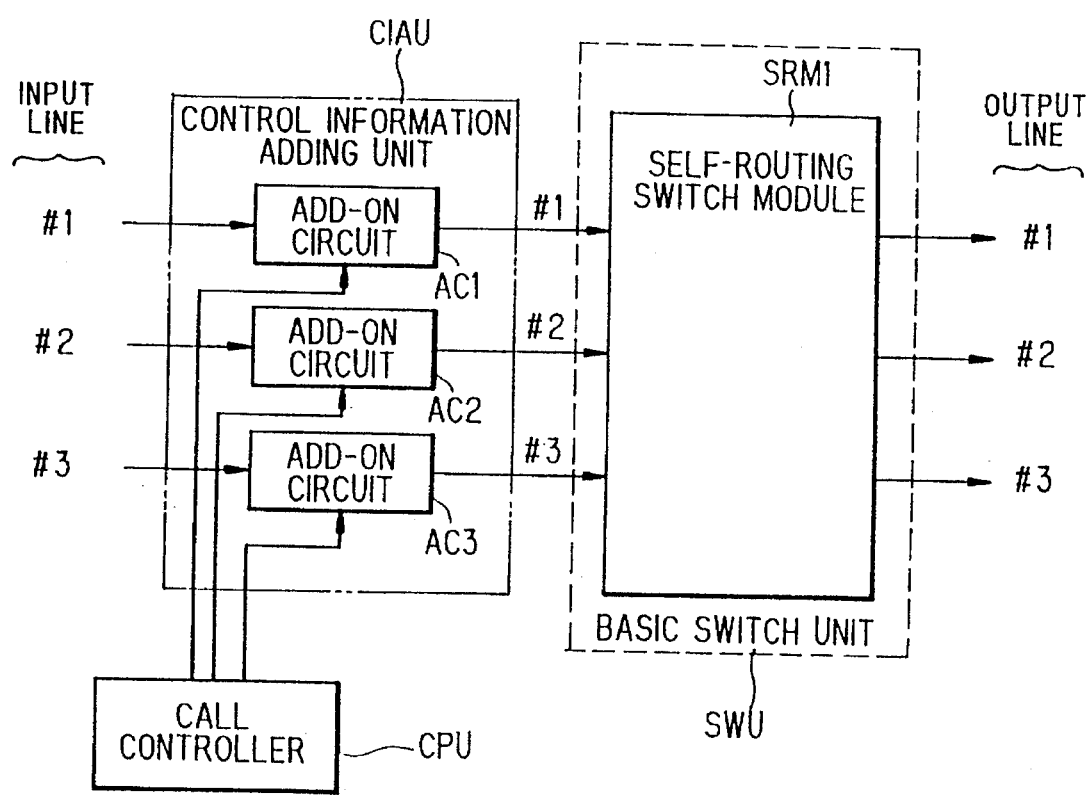
FIG. 28 shows the structure of a self-routing ATM network system.
Figure 29:
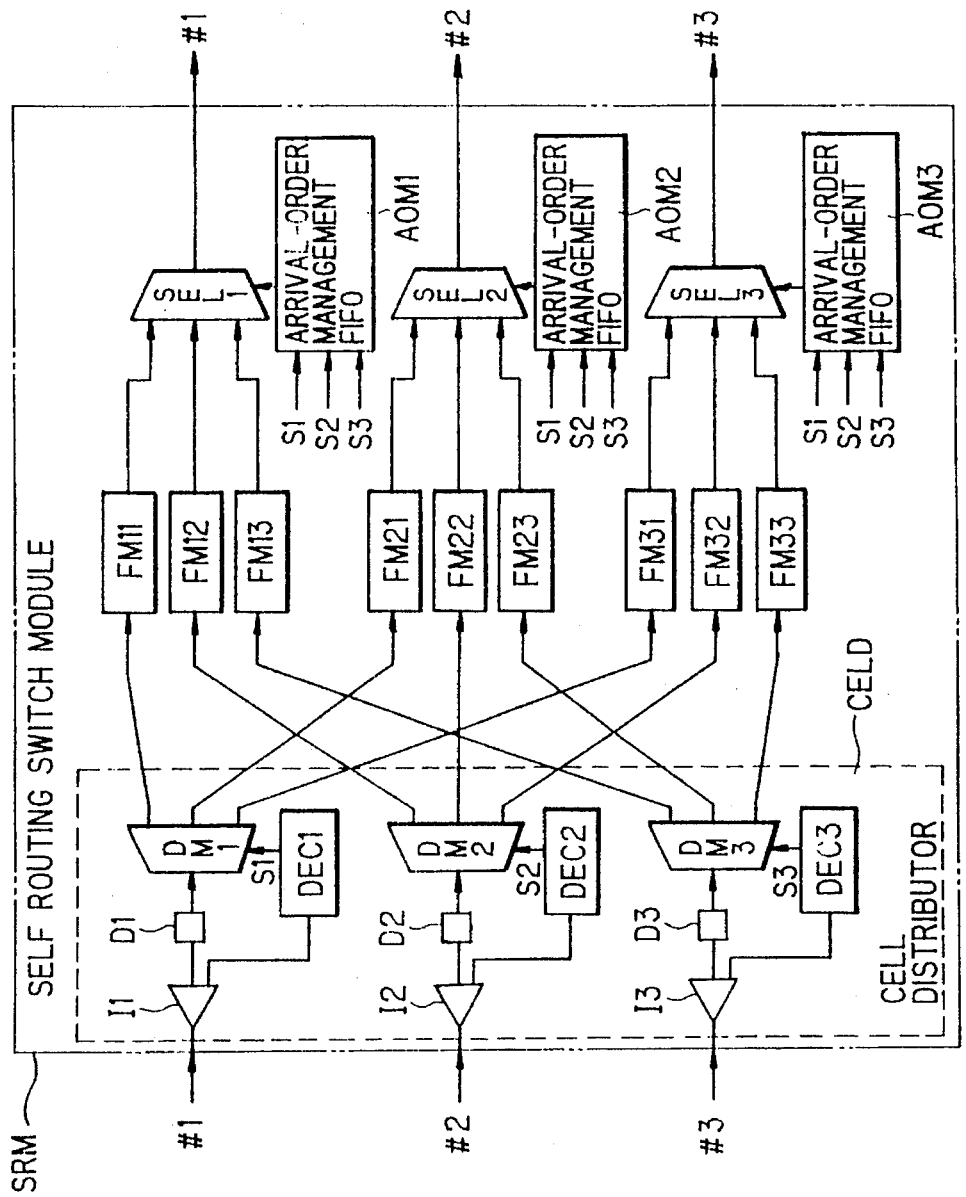
FIG. 29 is a circuit diagram of an example of a self-routing switch module.
Figure 30:
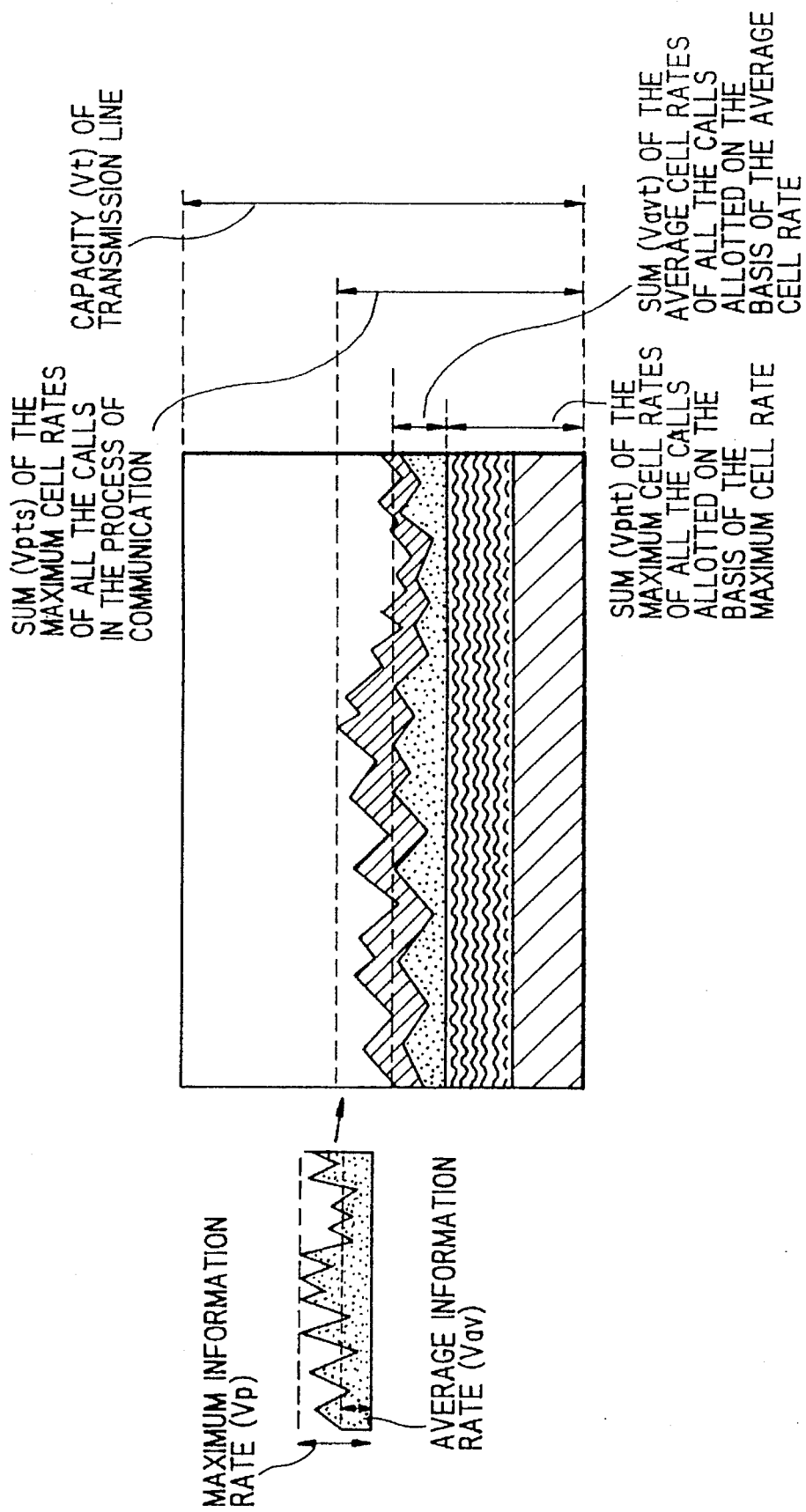
FIG. 30 is an explanatory view of the call reception control.
Figure 31:
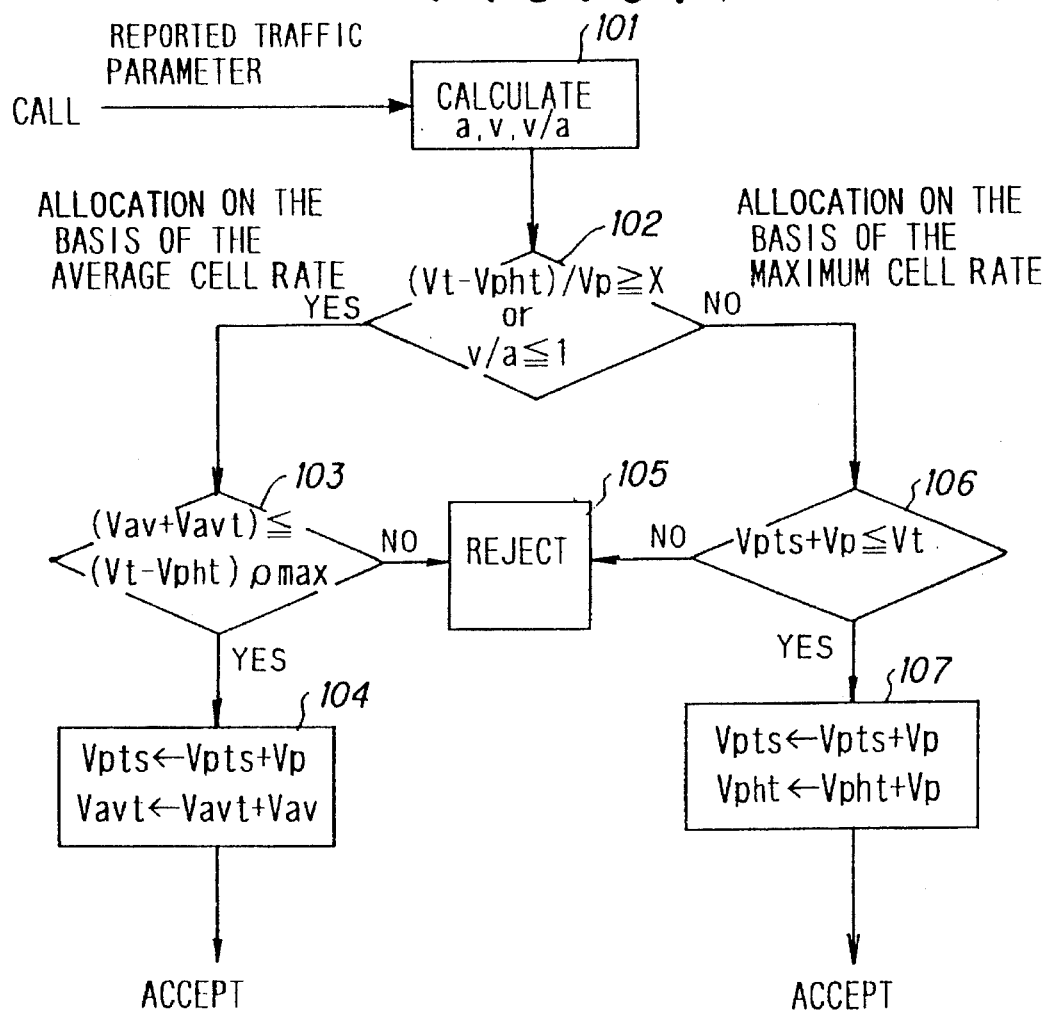
FIG. 31 is a flow chart of the call admission algorithm of a conventional ATM network system.

FIG. 18 shows the structure of an ATM network system according to the present invention. In FIG. 18, the reference numeral 21 represents an ATM network system (ATM-SW) having the structure such as that shown in FIG. 28. The reference numerals 22a to 22n represent line interface portions, 23a to 23n policing controller for monitoring whether or not cells flow as the user declared by comparing the bandwidth declared by the user with the current amount of cell which are passing, 24 a call admission controller for controlling the admission of calls, and 25 a memory for storing various tables and parameters. The memory 25 contains tables such as (1) a required bandwidth table QBT for showing the relationship between the sum $\Sigma Rai$ of the average cell rates and the required bandwidth $\Sigma Rai/f(\Sigma Rai)$ and (2) a utilization table URT for showing the relationship between the number of multiplexed calls in the transmission line and the utilization g(m), which will be described later.

(D) Call admission process

Figure 19:
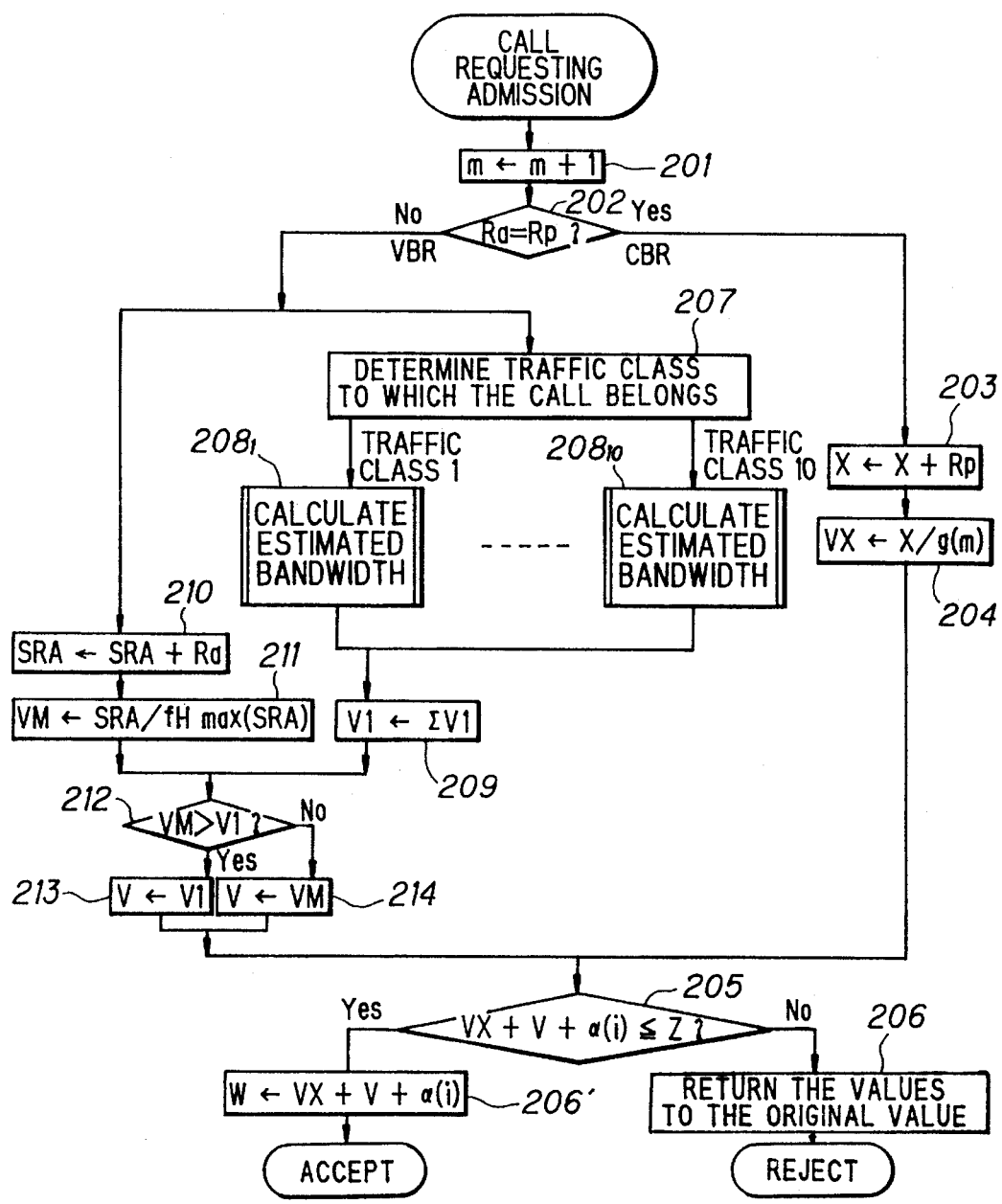
FIG. 19 is a flow chart of an entire call admission process.
Figure 20:
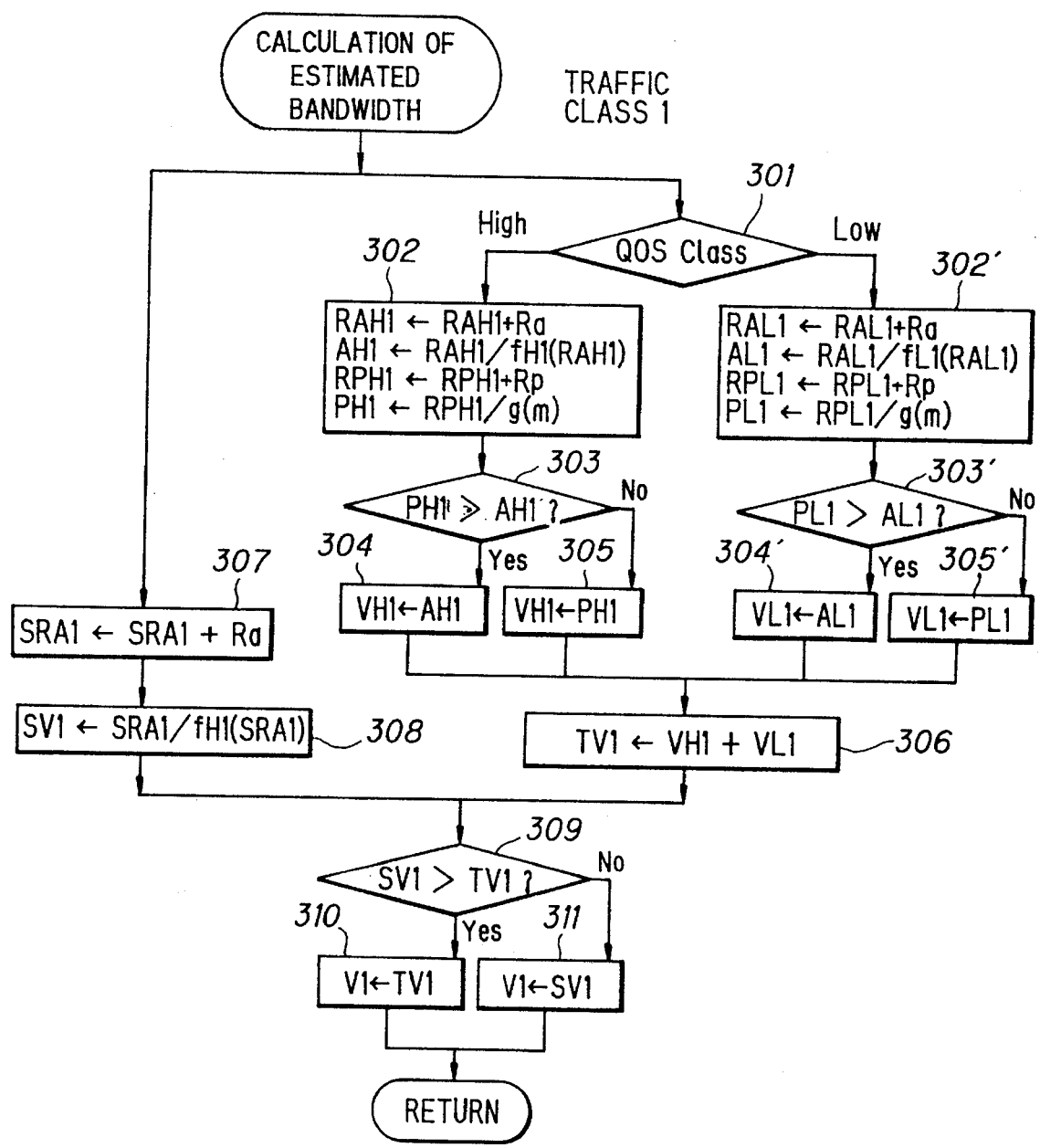
FIG. 20 is a flow chart of a call admission process in the case of traffic class 1.
Figure 21:
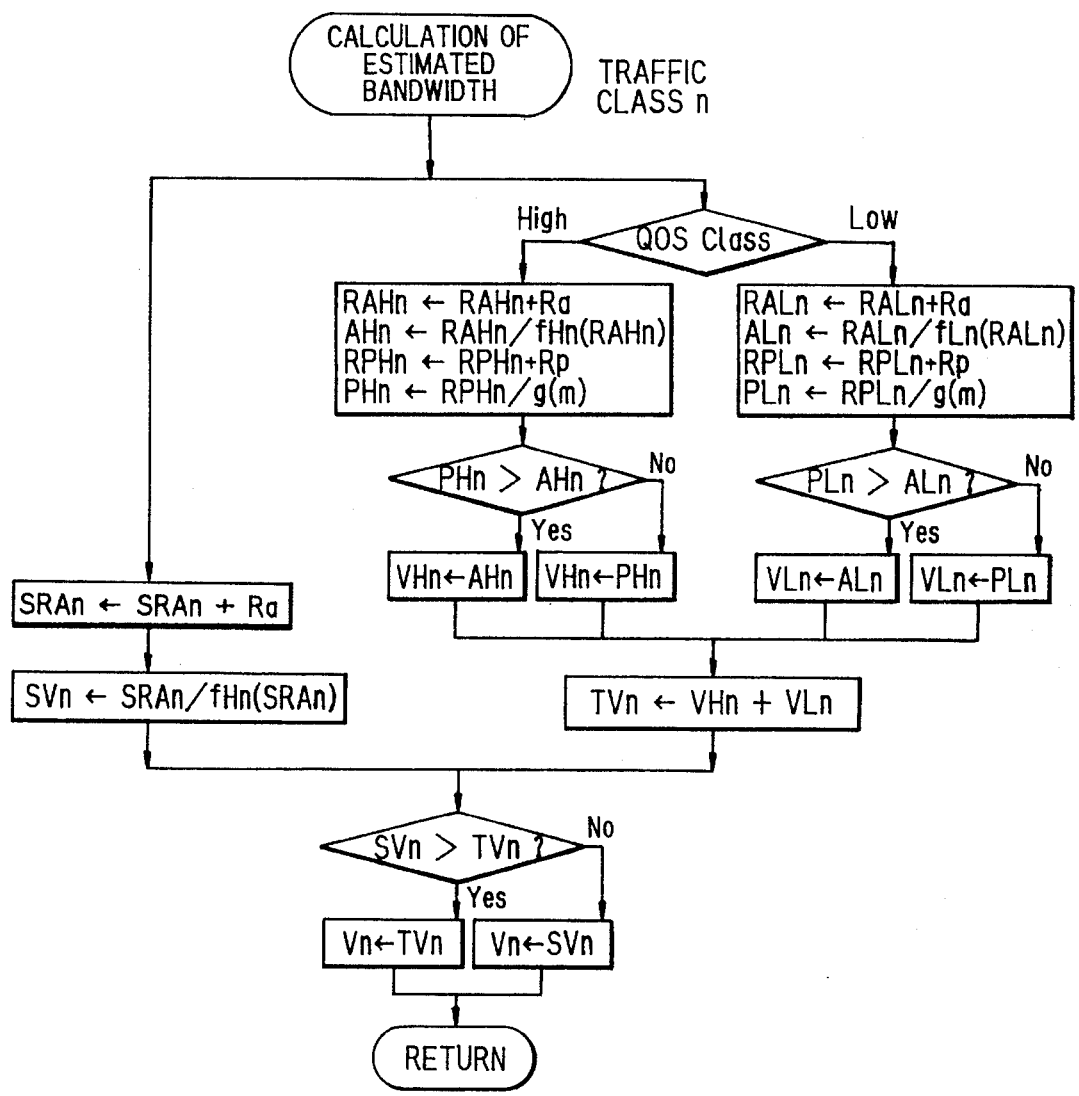
FIG. 21 is a flow chart of a call admission process in the case of traffic class n.
Figure 22:
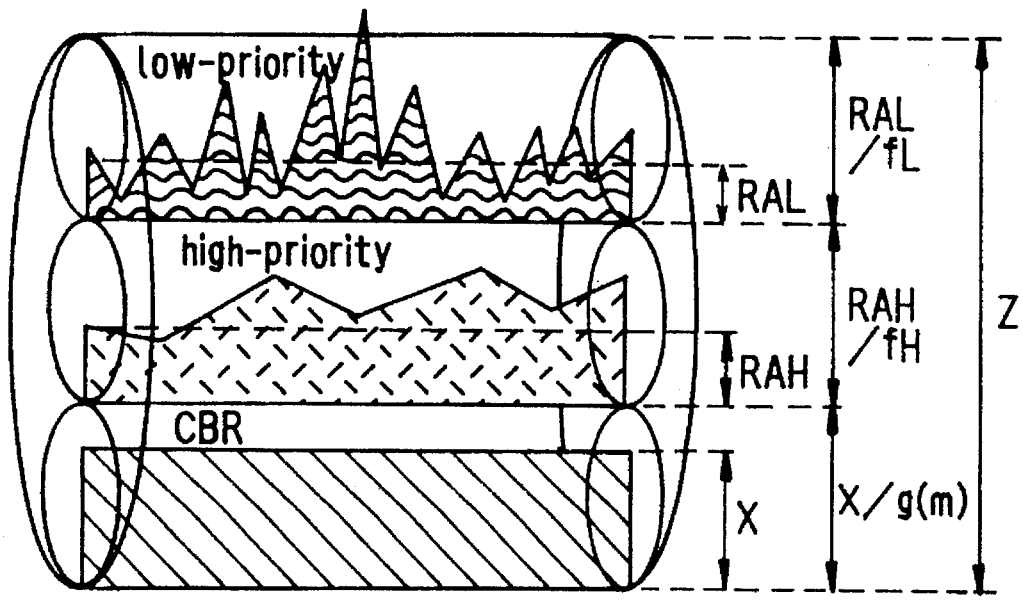
FIG. 22 is an explanatory view of a call admission process.

FIGS. 19 to 21 are flow charts of a call admission process in the present invention. FIG. 22 is an explanatory view of a connection admission control in the case of one traffic class.

When a terminating telephone number is input, an originating ATM terminal (user) transmits a call control message (originating terminal number, terminating terminal number, peak cell rate, average cell rate, cell loss ratio, etc.) to an ATM network system. When the call admission controller 24 of the exchange receives the message, it obtains a path (VPI) to the terminating terminal and judges whether or not there is vacancy in the path (transmission line) for transmitting the information. If the answer is YES, the exchange accepts the call (call requesting admission), while rejecting it if the answer is NO. Since there are generally a plurality of paths to the terminating terminal, if there is no vacancy in one VPI, the same process is conducted with respect to another VPI, and if there is no vacancy in any path, the call requesting admission is rejected.

When there is a call, the call admission controller 24 adds 1 to the number m of calls allotted to the transmission line (the number of multiplexed calls) ($m+1 \rightarrow m$, step 201), and then judges whether or not the average cell rate Ra agrees with the peak cell rate Rp which are declared by the user (step 202). If the answer is YES, the call requesting admission is judged to be a call having a constant bit rate (CBR), and to be a call having a variable bit rate (VBR) when the answer is NO.

If the call is a call having a constant bit rate like voice service, the peak cell rate Rp of the call requesting admission is added to the sum X of the bandwidths of the calls having a constant bit rate and already allotted to the transmission line ($X+Rp \rightarrow X$, step 203). Thereafter, the utilization $g(m)$ which corresponds to the current number m of multiplexed connections is read out of the table URT and the estimated bandwidth VX which is allocated to all the calls having a constant bit rate is calculated from the following formula (step 204):

$$X/g(m) \rightarrow VX$$

The utilization $g(m)$ is, for example, 1.0 when $m \leq 50$, and 0.8 to 0.9 when $m > 50$. In this case, when m changes from 50 to 51, X and VX are re-calculated by rendering the utilization $g(m)$ of m calls equal to a value ranging from 0.8 to 0.9. On the other hand, when m changes from 51 to 50, X and VX are re-calculated by rendering the utilization $g(m)$ of m calls equal to 1.0.

Thereafter, the estimated total bandwidth allocated to the transmission line is calculated from the following formula:

$$VX+V+\alpha(i)$$

by using the estimated bandwidth VX, the estimated bandwidth V allocated to all the calls having a variable-speed traffic property, and a safety coefficient $\alpha(i)$, and the estimated total bandwidth is compared with the physical bandwidth Z (step 205).

If $VX+V+\alpha(i)>Z$, since the estimated total bandwidth exceeds the physical bandwidth Z, the values m and X are restored to the original values (step 206). The call admission controller 24 thus rejects the call requesting admission and waits for the next call.

On the other hand, if $VX+V+\alpha(i) \leq Z$, since the estimated total bandwidth does not exceed the physical bandwidth Z, the current estimated total value W is renewed as $$VX+V+\alpha(i) \rightarrow W \text{ (step 206)}$$

The connection admission controller 24 thus accepts the call requesting admission and waits for the next call.

When the average cell rate Ra is different from the peak cell rate Rp at the step 202, the call requesting admission is judged to be a call having a variable bit rate (VBR). The traffic class (see FIG. 11) to which the peak cell rate (peak cell rate) Rp of the call requesting admission belongs is then obtained (step 207). When the traffic class is obtained, the bandwidth which is allocated to the traffic class (estimated bandwidth) is calculated (steps $208_1$ to $208_{10}$).

If the traffic class is traffic class 1, judgement is made as to whether the cell loss ratio is the high class ($1/10^{10}$) or the low class ($1/10^7$) (step 301). When the user has declared the cell loss ratio, the value is used as it is, but when the cell loss ratio has not been declared by the user, it is determined by the call admission controller 24. Actually, when there are not less than two guaranteed cell loss ratios, the cell loss ratio is identified by the combination of the bits for routing identifiers in the exchange.

If the cell loss ratio is the high class, the sum RAH1 of the average cell rates of the calls which belong to the traffic class 1 and which are allocated to the transmission line at the high class and the average cell rate of the call requesting admission is calculated from the following formula:

$$RAH1+Ra \rightarrow RAH1$$

The required bandwidth AH1 which corresponds to the sum RAH1 of the average cell rates in the traffic class 1 is then read out of the table QBT. When the relationship the sum RAH1 of the average cell rates and the utilization factor fH1(RAH1) is registered in the table QBT, the required bandwidth AH1 is calculated from the following formula:

$$RAH1/fH1(RAH1) \rightarrow AH1$$

Furthermore, the sum RPH1 of the peak cell rates of the calls which belong to the traffic class 1 and which are allocated to the transmission line at the high class and the peak cell rate of the call requesting admission is calculated from the following formula:

$$RPH1+Rp \rightarrow RPH1$$

The utilization $g(m)$ which corresponds to the current number m of multiplexed calls is then read out of the table URT, and the sum of the peak cell rates is corrected by the following formula to obtain PH1:

$$RPH1/g(m) \rightarrow PH1 \text{ (step 302)}$$

Thereafter, the required bandwidth AH1 is compared with the sum PH1 of the peak cell rates (step 303), and if PH1>AH1, AH1 is determined as the estimated bandwidth VH1 (step 304). On the other hand, if PH1 AH1, PH1 is determined as the estimated bandwidth VH1 (step 305).

In the above process, the sum PH1 of the peak cell rates is taken into consideration, but it is possible to determine AH1 directly as the estimated bandwidth VH1 without taking the sum PH1 of the peak cell rates into any consideration. In this case, the RPH1, PH1 calculation processing at the steps 302 and processing 303 and 305 are obviated.

The estimated bandwidth VH1 of the high class in the traffic class 1 is added to the estimated bandwidth VL1 of the low class in the traffic class 1, and the estimated bandwidth TV1 in the traffic class 1 is obtained (step 306).

If the cell loss ratio is the low class at the step 301, the sum RAL1 of the average cell rates of the calls which belong to the traffic class 1 and which are allocated to the transmission line at the low class and the average cell rate of the call requesting admission is calculated from the following formula:

$$RAL1+Ra \rightarrow RAL1$$

The required bandwidth AL1 which corresponds to the sum RAL1 of the average cell rates of the low class in the traffic class 1 is then read out of the table QBT. When the relationship the sum RAL1 of the average cell rates and the permissible utilization factor fL1(RAL1) is registered in the table QBT, the required bandwidth AL1 is calculated from the following formula:

$$RAL1/fL1(RAL1) \rightarrow AL1$$

Furthermore, the sum RPL1 of the peak cell rates of the calls which belong to the traffic class 1 and which are allocated to the transmission line at the low class and the peak cell rate of the call requesting admission is calculated from the following formula:

$$RPL1+Rp \rightarrow RPL1$$

The utilization g(m) which corresponds to the current number m of multiplexed calls is then read out of the table URT, and the sum of the peak cell rates is corrected by the following formula to obtain PLi:

$$RPL1/g(m) \rightarrow PL1 \text{ (step 302')}$$

Thereafter, the required bandwidth AL1 is compared with the sum PL1 of the peak cell rates (step 303'), and if PL1>AL1, AL1 is determined as the estimated bandwidth VL1 (step 304'). On the other hand, if PL1 AL1, PL1 is determined as the estimated bandwidth VL1 (step 305').

The estimated bandwidth VL1 of the low class in the traffic class 1 is added to the estimated bandwidth VH1 of the high class in the traffic class 1, and the estimated bandwidth TV1 in the traffic class 1 is obtained (step 306).

The above process is executed in correspondence with the cell loss ratio which is declared by the user or which is determined by the network among the two cell loss ratios, i.e., high cell loss ratio and low cell ratio. When only one cell loss ratio is prescribed, the processing at the step 301, and the steps 302' to 305' is obviated.

In parallel with the processing at the step 301 and the subsequent steps, the call admission controller 24 calculates the sum SRA1 of the average cell rates of the calls which belong to the traffic class 1 and which are already allocated to the transmission line and the average cell rate of the call requesting admission from the following formula:

$$SRA1+Ra \rightarrow SRA1$$

whenever a call belonging to the traffic class 1 generates (step 307). The required bandwidth SRA1/fH1(SRA1) which corresponds to the sum SRA1 of the average cell rates of the high class in the traffic class 1 is then read out of the table QBT, and this required bandwidth is determined as the required bandwidth SV1 when the traffic class 1 is not classified into high/low classes (step 308).

The required bandwidth TV1 obtained at the step 306 is then compared with the required bandwidth SV1 obtained at the step 308 (step 309), and when SV1>TV1, TV1 is determined as the required bandwidth of the traffic class 1 (step 310), while when SV1≦TV1, SV1 is determined as the required bandwidth of the traffic class 1 (step 311).

The reason for providing the steps 307 to 311 is as follows. If it is now assumed that the sum 100 Mb/s of the average cell rates is allocated to each of the high class and the low class of the traffic class 1, the estimated bandwidths of the high class and the low class are 190 Mb/s and 170 Mb/s, respectively, from FIG. 15. That is, the estimated bandwidth 360 Mb/s in total is allocated to the traffic class 1. However, when the traffic class is not classified into high/low classes, the estimated bandwidth which corresponds to 200 Mb/s is 330 Mb/s, which is smaller than 360 Mb/s, from FIG. 15. In this case, it is advantageous (for the purpose of effective use of the transmission line) to use the estimated bandwidth 330 Mb/s. The processing at the steps 307 to 311 is added for this purpose, but it is not essential.

If the traffic class to which the call requesting admission belongs is n, the estimated bandwidth is calculated in accordance with the flow chart shown in FIG. 21. The process for calculating the estimated bandwidth is completely the same as the case of the traffic class 1 shown in FIG. 20 except that the suffix is changed from 1 to n.

When the estimated bandwidth Vi (i=1, 2, . . . 10) of the traffic class i to which the call requesting admission belongs is determined in the above-described manner, the estimated bandwidths of all the traffic classes are added to obtain the estimated bandwidth VI (step 209).

In parallel with the processing at the step 207 and the subsequent steps, the call admission controller 24 calculates the sum total SRA of the average cell rates of all the calls that are not classified into traffic classes, from the following formula:

$$SRA+Ra \rightarrow SRA$$

whenever a call having a variable-speed traffic property generates (step 210). The highest traffic class m among the traffic classes to which the calls in the process of communication through the transmission line belong is then obtained. The required bandwidth SRA/fHmax(SRA) which corresponds to the sum SRA of the average cell rates of the high class in the traffic class m is read out, and the required bandwidth read out is determined as the estimated bandwidth VM when the calls are not classified into traffic classes (step 211).

The estimated bandwidths VI and VM obtained at the steps 209 and 211, respectively, are compared with each other (step 212), and when VM>VI, VI is determined as the estimated bandwidth V of all the calls having a variable-speed traffic property (step 213). On the other hand, when VM≦VI, VM is determined as the estimated bandwidth V of all the calls having a variable-speed traffic property (step 214).

The reason for providing the steps 210 to 214 is as follows. If it is now assumed that the sum 50 Mb/s of the average cell rates is allocated to the traffic class 1, and the sum 100 Mb/s of the average cell rates is allocated to the traffic class 2, the estimated bandwidths of the traffic classes 1 and 2 are 120 Mb/s and 290 Mb/s, respectively, from FIG. 16. That is, the estimated bandwidth 410 Mb/s in total is allocated to the traffic classes 1 and 2. However, if the call is not classified depending upon the traffic class and the bandwidth 150 Mb/s is allocated to the traffic class 2, the estimated bandwidth is 370 Mb/s, which is smaller than 410 Mb/s, from FIG. 16. In this case, it is advantageous (for the purpose of effective use of the transmission line) to use the estimated bandwidth 370 Mb/s. The processing at the steps 210 to 214 is added for this purpose, but it is not essential.

After the estimated bandwidth V of the call having a variable-speed traffic property is obtained, the estimated total bandwidth which is allocated to the transmission line is calculated from the following formula:

$$VX+V+\alpha(i)$$

by using the estimated bandwidth V of all the calls having a variable-speed traffic property, the estimated bandwidth VX of all the calls having a fixed-speed traffic property, and the safety coefficient $\alpha(i)$, and then the estimated total bandwidth is compared with the physical bandwidth Z (step 205).

If $VX+V+\alpha(i)>Z$, since the estimated total bandwidth exceeds the physical bandwidth Z, the values m and X are restored to the original values (step 206). The call admission controller 24 thus rejects the call requesting admission and waits for the next call.

On the other hand, if $VX+V+\alpha(i)\leq Z$, since the estimated total bandwidth does not exceed the physical bandwidth Z, the current estimated total value W is renewed as $$VX+V+\alpha(i)\rightarrow W \text{ (step 206')}$$

The call admission controller 24 thus accepts the call requesting admission and waits for the next call.

(E) Call release process

Figure 23:
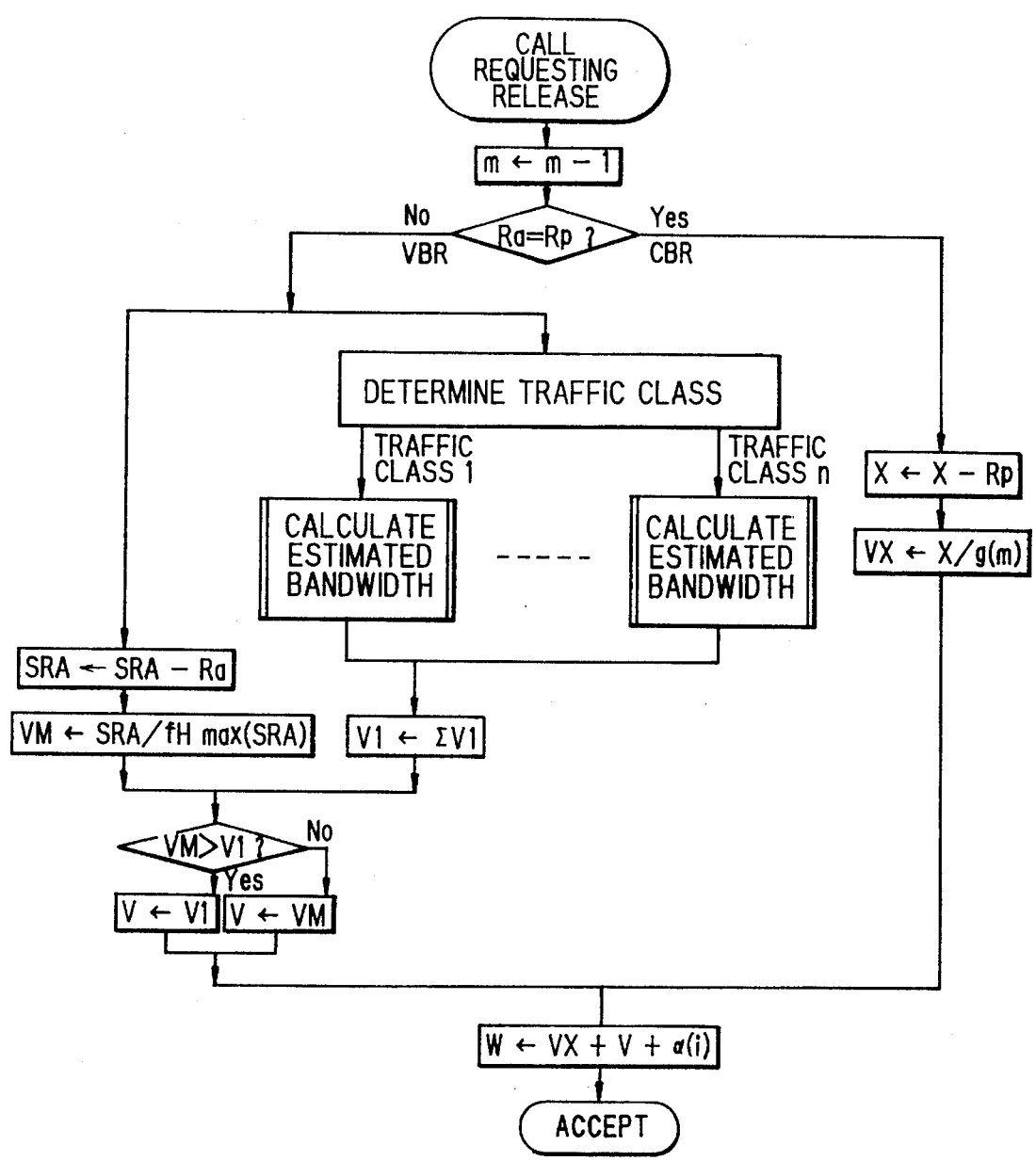
FIG. 23 is a flow chart of an entire call release process.
Figure 24:
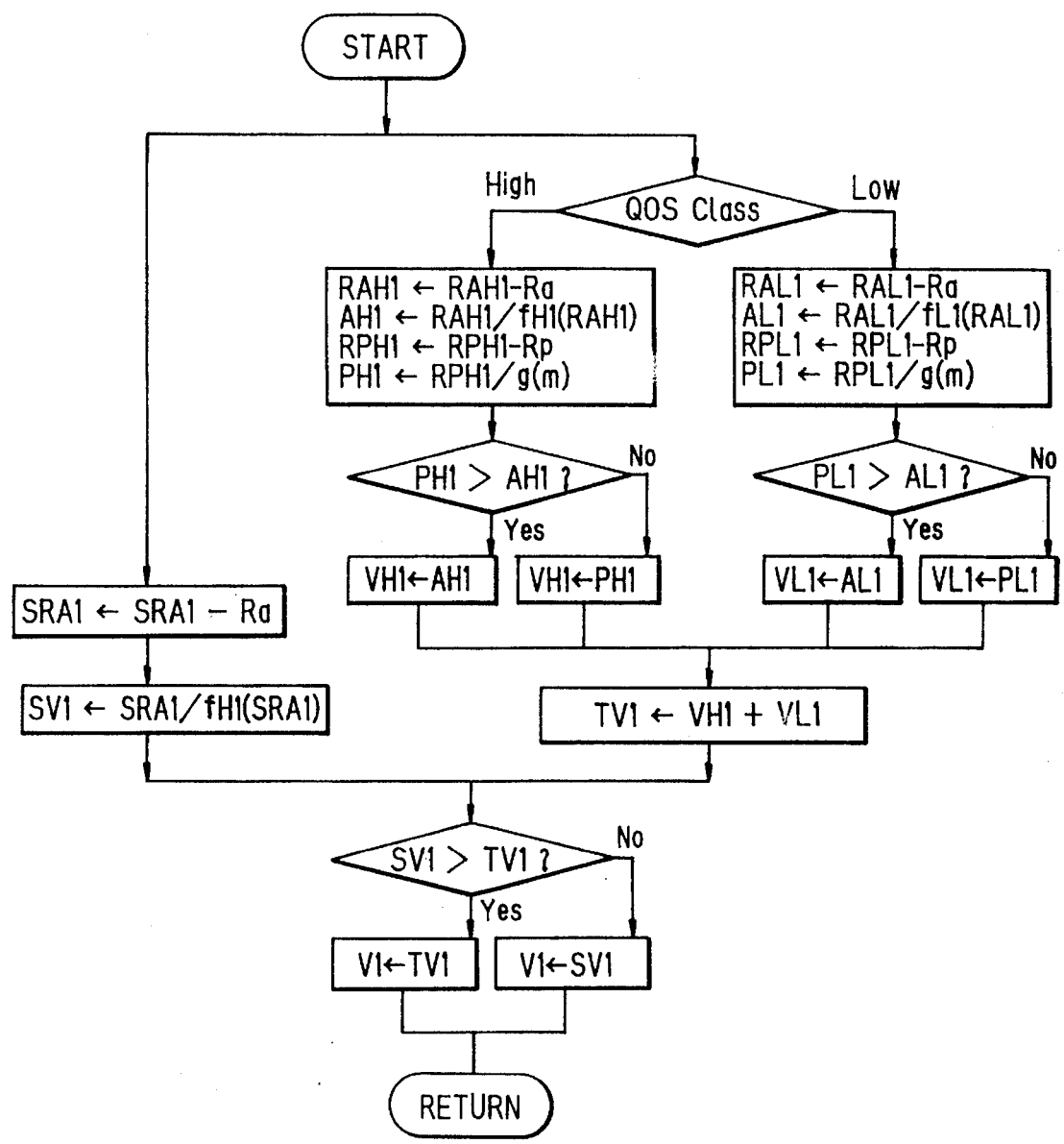
FIG. 24 is a flow chart of a call release process in the case of traffic class 1.
Figure 25:
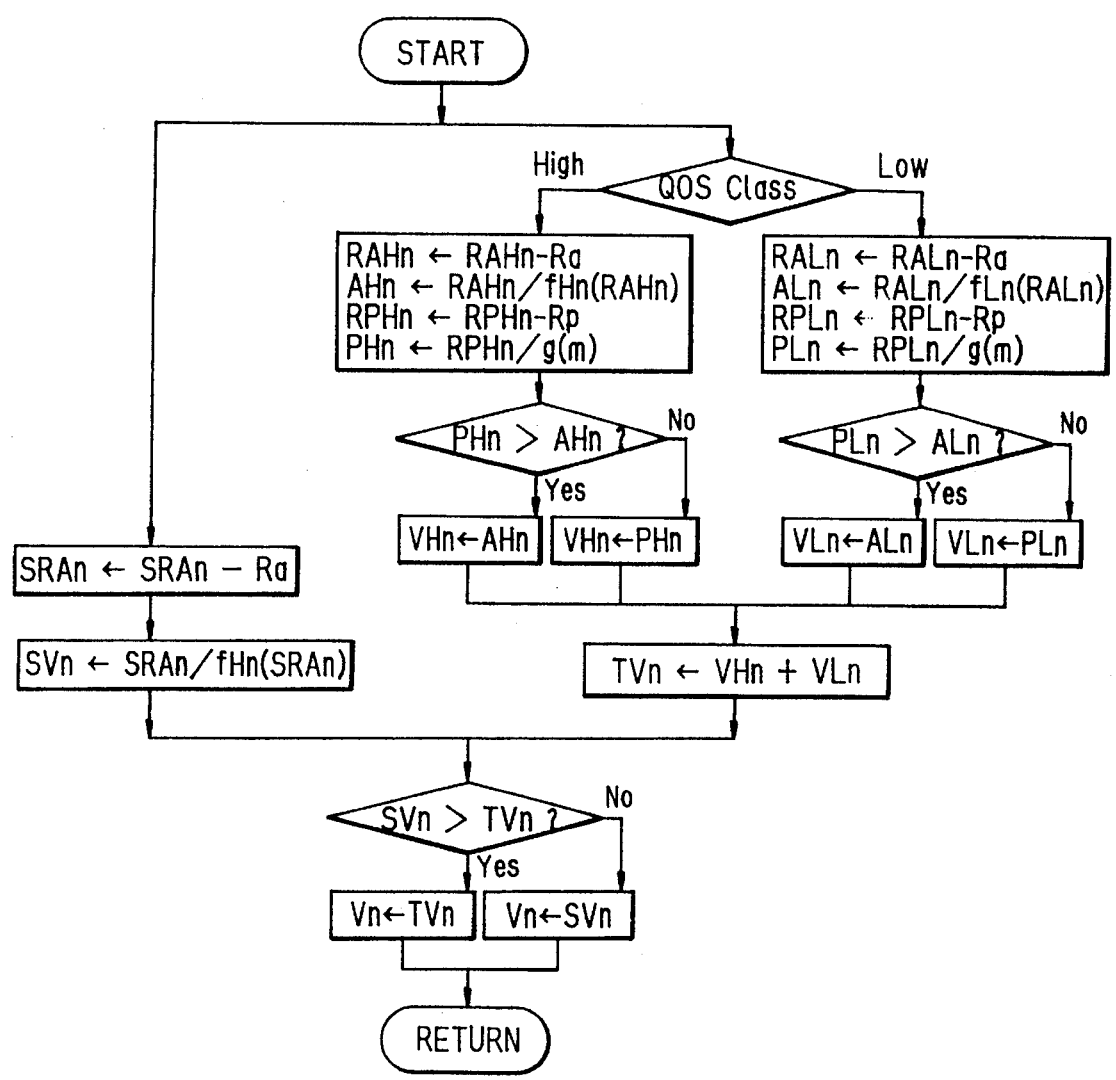
FIG. 25 is a flow chart of a call release process in the case of traffic class n.
Figure 26:
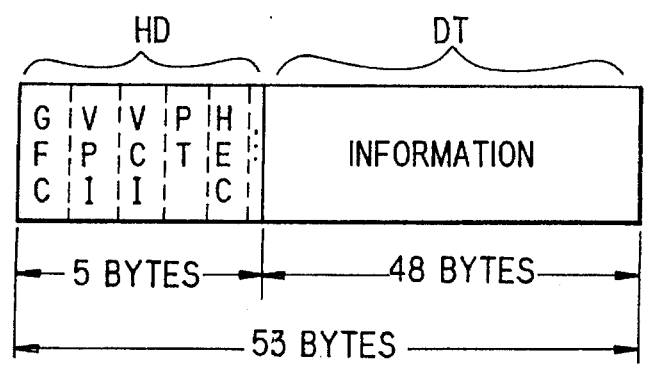
FIG. 26 shows the structure of an ATM cell.
Figure 27:
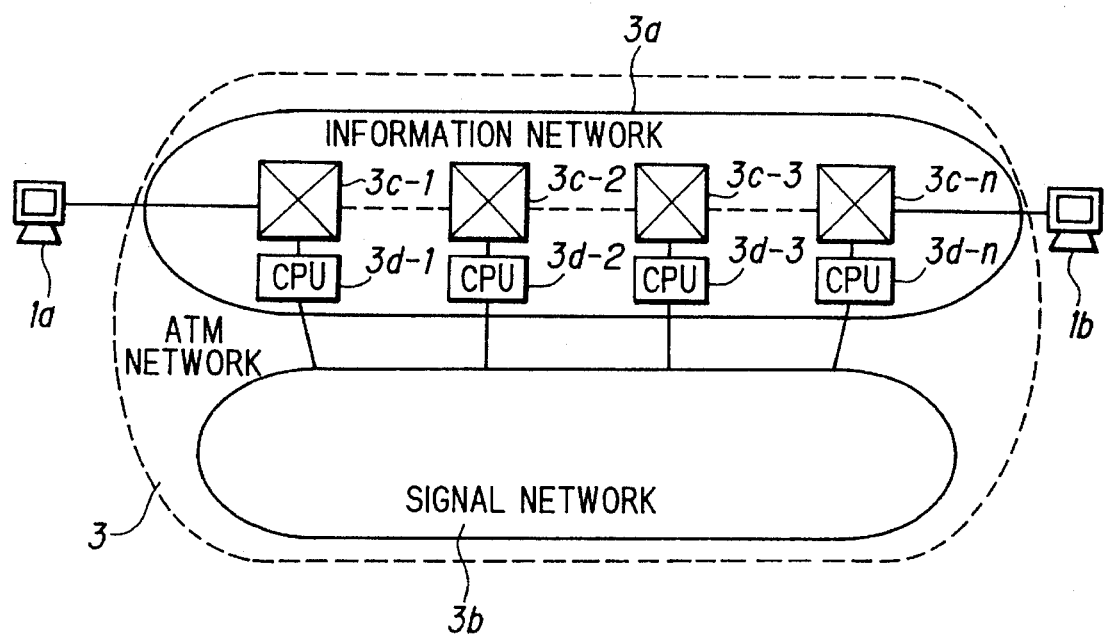
FIG. 27 is the schematic structure of an ATM network.

FIGS. 23 to 25 are flow charts of a call release process when the call allocated to the transmission line finishes communication and requests release.

FIG. 23 is a flow chart of an entire call release process, FIG. 24 is a flow chart of a call release process when a call requesting release has a variable-speed traffic property and belongs to the traffic class 1, and FIG. 25 is a flow chart of a call release process when a call requesting release has a variable-speed traffic property and belongs to the traffic class n.

The call release process is the nearly same as the call admission process except in (1) that the steps 205 and 206 in the call admission process are not included in the call release process and (2) that although 1 is added to the count m at the step 201 and the average cell rate Ra or the peak cell rate Rp is added at the steps 203, 210, 302 and 302' in the call admission process, 1 is subtracted from the count m and the average cell rate Ra or the peak cell rate Rp is subtracted in the call release process.

As described above, according to the present invention, it is possible to allocate calls having a burst traffic property (variable-speed traffic property) and calls having a fixed-speed property to a bandwidth separately from each other. In the case of accepting a call having a burst traffic property, it is possible to calculate the required bandwidth which can guarantee the quality of service such as the cell loss ratio and to allocate a bandwidth to the call approximately on the basis of the average cell rate. As a result, it is possible to allocate many calls to the transmission line while guaranteeing the quality of service such as a cell loss ratio, thereby enhancing the utilization of the transmission line.

Since the required bandwidth for each traffic class is registered in advance in a table in correspondence with the sum of the average cell rates, it is possible to calculate the sum of the estimated bandwidths for all the traffic classes by a simple operation and to judge whether or not the transmission line has a vacant bandwidth which is necessary for accepting the call requesting admission.

In addition, according to the present invention, the worst burst traffic model in which the cell loss ratio becomes worst is assumedly predetermined on the basis of the peak cell rate, and the required bandwidth which satisfies the required cell loss ratio is determined on the basis of the worst burst traffic model and registered in a table for each traffic class in correspondence with the sum of the average cell rates. In other words, since the required bandwidth is determined in consideration of a large safety ratio, it is possible to prevent the actual total bandwidth of all the calls allocated to the transmission line from exceeding the physical bandwidth of the transmission line.

According to the present invention, since the required bandwidth of the traffic class to which a call requesting admission belongs is compared with the sum of the peak cell rates (bandwidths) of the calls which belong to that traffic class, and the smaller bandwidth is regarded as the estimated bandwidth of the traffic class, it is possible to estimate the total bandwidth of all the calls allocated to the transmission line more appropriately and at a small value, thereby effectively utilizing the transmission line.

Furthermore, in the present invention, the required bandwidths which satisfy the cell loss ratios of the high class and the low class, respectively, are registered in a table in correspondence with the sum of the average cell rates, and every time a call generates, a first required bandwidth is obtained from the table in which the cell loss ratio is stricter. A required bandwidth is also obtained from the table which corresponds to the cell loss ratio declared by the user or determined by the network, and then a second required bandwidth is obtained by computing the sum of the required bandwidths for the respective cell loss ratios. Thereafter, the first required bandwidth and the second required bandwidth are compared with each other, and if the former is smaller than the latter, the first required bandwidth is determined as the estimated bandwidth. In this manner, it is possible to estimate the total bandwidth of all the calls allocated to the transmission line more appropriately and at a small value, thereby effectively utilizing the transmission line.

In addition, according to the present invention, the sum of the estimated bandwidths determined for the respective traffic classes is compared with the estimated bandwidth which is obtained without classification depending upon the traffic class on the assumption that all the calls belong to one traffic class (the traffic class of the highest grade among the traffic classes to which the calls allocated to the transmission line belong). If the latter is smaller than the former, the latter required bandwidth is determined as the estimated total bandwidth of all the calls that are allocated to the transmission line. Consequently, it is possible to estimate the total bandwidth of all the calls allocated to the transmission line more appropriately and at a small value, thereby effectively utilizing the transmission line.

As many apparently widely different embodiments of the present invention can be made without departing from the spirit and scope thereof, it is to be understood that the invention is not limited to the specific embodiment thereof except as defined in the appended claims.

What is claimed is:

1. A connection admission control method in a network system for transmitting information having a fixed-speed traffic property or a variable-speed traffic property with a cell which is a fixed length packet, said method comprising:

a first step of judging that a call (call requesting admission) has a variable-speed traffic property when an average cell rate and a peak cell rate which are declared at the time of calling are different, and identifying traffic class to which said call belongs on the basis of said peak cell rate;

a second step of obtaining the required bandwidth for guaranteeing the quality of service (QOS) as an estimated bandwidth on the basis of the sum of the average cell rate of said call requesting admission and the average cell rates of all the calls that belong to said traffic class and that are already allocated to a transmission line;

a third step of judging whether or not there is a vacant bandwidth in said transmission line which is necessary for accepting said call requesting admission, with the sum of the estimated bandwidths for all traffic classes and the physical bandwidth of said transmission line taken into consideration; and a fourth step of accepting said call if the answer is in the affirmative, while rejecting said call if the answer is in the negative.

2. A connection admission control method in a network system according to claim 1, wherein said second step includes:

a first sub-step of registering the required bandwidth which satisfies the required cell loss ratio for each traffic class in a table in advance in correspondence with the sum of the average cell rates; and a second sub-step of obtaining said required bandwidth as an estimated bandwidth from said table.

3. A connection admission control method in a network system according to claim 1, wherein said second step includes:

a first sub-step of registering a permissible utilization factor $f_i$ which satisfies the required cell loss ratio for each traffic class in a table in advance in correspondence with the sum of the average cell rates; and a second sub-step of obtaining said permissible utilization factor $f_i$ from said table and computing said required bandwidth by dividing the sum of the average cell rates by said permissible utilization factor $f_i$.

4. A connection admission control method in a network system according to claim 2, wherein said first sub-step includes:

a step of creating a worst burst model in which the cell loss ratio becomes worst in correspondence with each traffic class; and a step of registering the required bandwidth which satisfies the required cell loss ratio for each traffic class in a table in correspondence with the sum of the average cell rates on the assumption that a call of said worst burst model generates.

5. A connection admission control method in a network system according to claim 1, wherein said second step includes:

a step of obtaining the required bandwidth of the traffic class to which said call belongs;

a step of comparing said required bandwidth with the sum of the peak cell rates of all the calls that belong to said traffic class; and a step of determining the smaller one in the comparing step as the estimated bandwidth of said traffic class.

6. A connection admission control method in a network system according to claim 1, wherein said second step includes:

a first sub-step of registering the required bandwidth which satisfies the cell loss ratio in a table for each traffic class and each of at least two required cell loss ratios in correspondence with the sum of the average cell rates; and a second sub-step of obtaining from said table said required bandwidth which satisfies the cell loss ratio declared by user or determined by the network.

7. A connection admission control method in a network system according to claim 6, wherein said second sub-step includes:

a step of obtaining a first required bandwidth by using the table which corresponds to the smallest cell loss ratio whenever a call generates;

a step of obtaining a required bandwidth from the table which corresponds to the cell loss ratio declared by said user or determined by the network, and obtaining a second required bandwidth by computing the sum of the required bandwidths for the respective cell loss ratios;

a step of comparing said first required bandwidth with said second required bandwidth; and a step of determining said first required bandwidth as the estimated bandwidth when said first required bandwidth is smaller than said second required bandwidth, while determining said second required bandwidth as the estimated bandwidth when said second required bandwidth is smaller than said first required bandwidth.

8. A connection admission control method in a network system according to claim 1, wherein said third step includes:

a step of comparing the sum of the estimated bandwidths for the respective traffic classes obtained by classifying calls into traffic classes, with the estimated bandwidth obtained without classification on the assumption that all calls belong to one predetermined traffic class; and a step of judging whether or not there is a vacant bandwidth in said transmission line which is necessary for accepting said call requesting admission, with the latter estimated bandwidth and the physical bandwidth of said transmission line taken into consideration, when the latter estimated bandwidth is smaller than said sum in the comparing step.

9. A connection admission control method in a network system according to claim 6, wherein said cell loss ratios are distinguished from each other by a combination of routing identifier bits used in said ATM network system.

10. A connection admission control method in a network system according to claim 1, further comprising:

a fifth step of judging that said call has a fixed-speed traffic property when said average cell rate and said peak cell rate which are declared at the time of calling are coincident with each other, and judging whether or not there is a vacant bandwidth in said transmission line which is necessary for accepting said call requesting admission by considering said average cell rate or said peak cell rate as said vacant bandwidth necessary for said call; and a sixth step of accepting said call when there is said vacant bandwidth, while rejecting said call when there is no said vacant bandwidth.

11. A connection admission control method in a network system according to claim 10, wherein said vacant bandwidth which is necessary for accepting said call is a bandwidth obtained by dividing said peak cell rate of said call by a coefficient $g(m)$ which corresponds to the number of multiplexed connections.

12. A connection admission control method in a network system according to claim 11, wherein said coefficient $g(m)$ is registered.

13. A connection admission control method in a network system for transmitting information with a cell which is a fixed length packet, comprising the steps of:

judging whether an average cell rate and a peak cell rate which are declared at the time of calling are different;

identifying traffic class of said call on the basis of said peak cell rate if said average cell rate and said peak rate are different from each other;

obtaining the required bandwidth for guaranteeing the quality on the basis of the sum of the average cell rates of all the calls belonging to said traffic class and said average cell rate;

calculating the sum of said required bandwidths for all traffic classes;

calculating said average cell rate and said peak cell rate coincident with each other, the bandwidth necessary for all the calls having a fixed-speed traffic property;

comparing the sum of the calculated sum of said required bandwidths for all traffic classes and said bandwidth necessary for all the calls having a fixed-speed traffic property, with the physical bandwidth of said transmission line; and accepting said call when said sum is smaller than said physical bandwidth, while rejecting said call when said sum is larger than said physical bandwidth.

14. A connection admission control system in a network for transmitting information having a fixed-speed traffic property or a variable-speed traffic property with a cell which is a fixed length packet, said system comprising:

first means for judging that a call (call requesting admission) has a variable-speed traffic property when an average cell rate and a peak cell rate which are declared at the time of calling are different;

second means for identifying traffic class to which said call belongs on the basis of said peak cell rate;

third means for obtaining a required bandwidth for guaranteeing quality of service (QOs) as an estimated bandwidth on the basis of the sum of the average cell rate of said call requesting admission and the average cell rates of all the calls that belong to said traffic class and that are already allocated to a transmission line;

fourth means for judging whether or not there is a vacant bandwidth in said transmission line which is necessary for accepting said call requesting admission, with the sum of the estimated bandwidths for all traffic classes and the physical bandwidth of said transmission line taken into consideration; and fifth means for accepting said call if the answer is in the affirmative, while rejecting said call if the answer is in the negative.

15. A connection admission control system in a network according to claim 14, wherein said third means includes:

means for registering the required bandwidth which satisfies the required cell loss ratio for each traffic class in a table in advance in correspondence with the sum of the average cell rates; and means for obtaining said required bandwidth as an estimated bandwidth from said table.

16. A connection admission control system in a network according to claim 14, wherein said third means includes:

means for registering a permissible utilization factor $f_i$ which satisfies the required cell loss ratio for each traffic class in a table in advance in correspondence with the sum of the average cell rates;

means for obtaining said permissible utilization factor $f_i$ from said table; and means for computing said required bandwidth by dividing the sum of the average cell rates by said permissible utilization factor $f_i$.

17. A connection admission control system in a network according to claim 14, wherein said fourth means includes:

means for comparing the sum of the estimated bandwidths for the respective traffic classes obtained by classifying calls into traffic classes, with estimated bandwidth obtained without classification on the assumption that all calls belong to one predetermined traffic class; and means for judging whether or not there is a vacant bandwidth in said transmission line which is necessary for accepting said call requesting admission, with the latter estimated bandwidth and the physical bandwidth of said transmission line taken into consideration, when the latter estimated bandwidth is smaller than said sum.

18. A connection admission control system in a network according to claim 14, further comprising:

sixth means for judging that said call has a fixed-speed traffic property when said average cell rate and said peak cell rate which are declared at the time of calling are coincident with each other;

seventh means for judging whether or not there is a vacant bandwidth in said transmission line which is necessary for accepting said call requesting admission by considering said average cell rate or said peak cell rate as said vacant bandwidth necessary for said call; and eighth means for accepting said call when there is said vacant bandwidth, while rejecting said call when there is no said vacant bandwidth.

19. A connection admission control system in a network for transmitting information with a cell which is a fixed length packet, comprising:

means for judging whether an average cell rate and a peak cell rate which are declared at the time of calling are different;

means for identifying traffic class of said call on the basis of said peak cell rate if said average call rate and said peak cell rate are different from each other;

means for obtaining a required bandwidth for guaranteeing quality on the basis of the sum of the average cell rates of all the calls belonging to said traffic class and said average cell rate;

means for calculating the sum of said required bandwidths for all traffic classes;

means for calculating the bandwidth necessary for all the calls having a fixed-speed traffic property if said average cell rate and said peak cell rate are coincident with each other;

means for comparing the sum of the calculated sum of said required bandwidths for all traffic classes and said bandwidth necessary for all the calls having a fixed-speed traffic property, with the physical bandwidth of said transmission line; and means for accepting said call when said sum is smaller than said physical bandwidth, while rejecting said call when said sum is larger than said physical bandwidth.

* * * * *